United States Patent [19]
Lipo et al.

[11] Patent Number: 6,005,788
[45] Date of Patent: Dec. 21, 1999

[54] HYBRID TOPOLOGY FOR MULTILEVEL POWER CONVERSION

[75] Inventors: Thomas A. Lipo, Middleton; Madhav D. Manjrekar, Madison, both of Wis.

[73] Assignee: Wisconsin Alumni Research Foundation, Madison, Wis.

[21] Appl. No.: 09/249,643

[22] Filed: Feb. 12, 1999

Related U.S. Application Data

[60] Provisional application No. 60/074,679, Feb. 13, 1998.
[51] Int. Cl.$^6$ .................................................. H02M 7/537
[52] U.S. Cl. .............................................................. 363/71
[58] Field of Search ................................. 363/65, 71, 95, 363/97, 131, 132

[56] References Cited

U.S. PATENT DOCUMENTS

| | | | |
|---|---|---|---|
| 4,814,963 | 3/1989 | Petersen | 363/71 |
| 5,625,545 | 4/1997 | Hammond . | |
| 5,666,278 | 9/1997 | Ng et al. | 363/71 |
| 5,805,437 | 9/1998 | Grüning . | |
| 5,852,558 | 12/1998 | Julian et al. | 363/132 |

OTHER PUBLICATIONS

Nabae, et al., A New Neutral–Point–Clamped PWM Inverter, IEEE–IAS '80, Conf. Proc., pp. 761–766, May, 1980.

M. Marchesoni, et al., A Non Conventional Power Converter for Plasma Stabilization, IEEE–PESC '88 Conf. Rec., pp. 122–129, Jun. 1988.

C. Hochgraf, et al., Comparison of Multilevel Inverters for Static Var Compensation, IEEE–IAS '94 Conf. Proc., pp. 921–928, Sep. 1994.

J.S. Lai & F.Z. Peng, Multilevel Converters—A New Breed of Power Converters, IEEE–IAS '95 Conf. Rec., pp. 2348–2356, Aug. 1995.

M. Manjrekar & G. Venkataramanan, Advanced Topologies and Modulation Strategies for Multilevel Inverters, IEEE–PESC '96 Conf. Rec., pp. 1013–1018, Sep. 1996.

Damiano, et al., A New Approcah In Multilevel Power Conversion, EPE' 97 Conf. Rec., pp. 4.216–4.221, May 1997.

S. H. Hosseini & R.M. Mathur, A Binary Multi–Level Voltage Source Inverter for Static VAR Generation, IEEE–CCECE '97 Conf. Rec., pp. 427–430, Jun. 1997.

*Primary Examiner*—Matthew Nguyen
*Attorney, Agent, or Firm*—Foley & Lardner

[57] ABSTRACT

The present invention provides a multilevel electric power converter including a plurality of DC voltage sources providing different DC source voltage levels. The DC source voltage levels are preferably multiples of each other and may vary in a binary fashion or in a geometric progression with a factor of three to provide a large number of output voltage levels for a given number of inverter levels. The multilevel inverter is preferably implemented as a series connected set of H-bridge inverters, with each H-bridge inverter having an independent DC voltage source providing the desired DC source voltage level. A hybrid modulation strategy may be employed whereby the lowest voltage level inverter is modulated at a high frequency, e.g., by pulse width modulation, and higher voltage level inverters in the multilevel inverter are modulated to provide a low frequency stepped waveform. The combined high frequency pulse width modulated and low frequency stepped waveform has good spectral quality. A high voltage high quality waveform may be generated in this manner by taking advantage of the high voltage blocking capability of switching devices, such as GTO thyristors, in the high voltage inverters in the multilevel inverter, and the high frequency switching characteristics of switching devices, such as IGBTs, in the lowest voltage level inverter in the multilevel inverter. A multilevel inverter in accordance with the present invention may be employed in a single-phase or multi-phase applications.

31 Claims, 14 Drawing Sheets

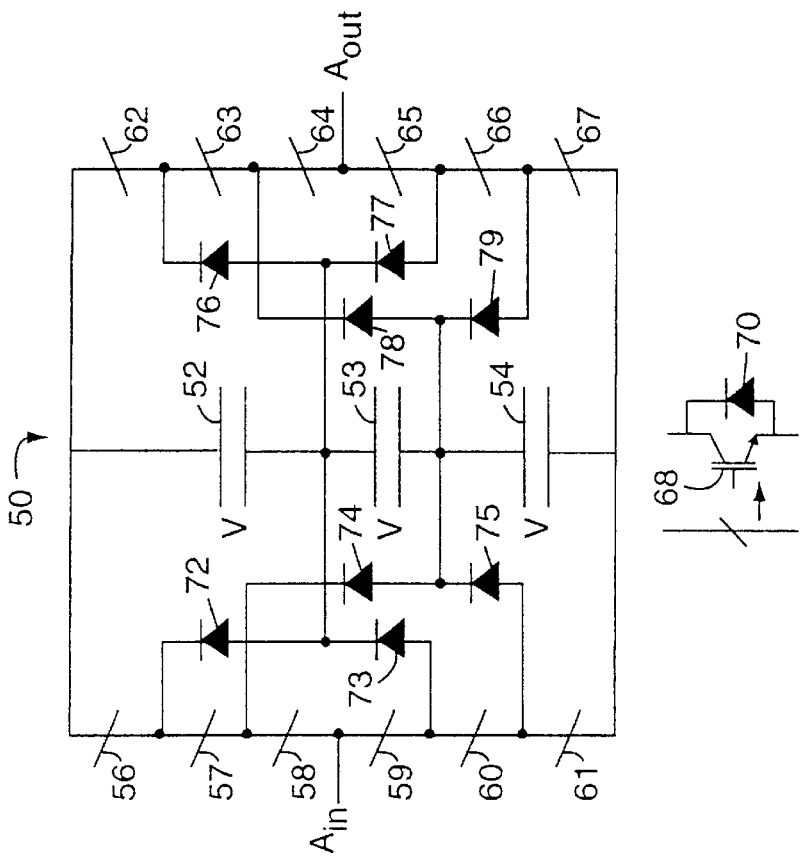
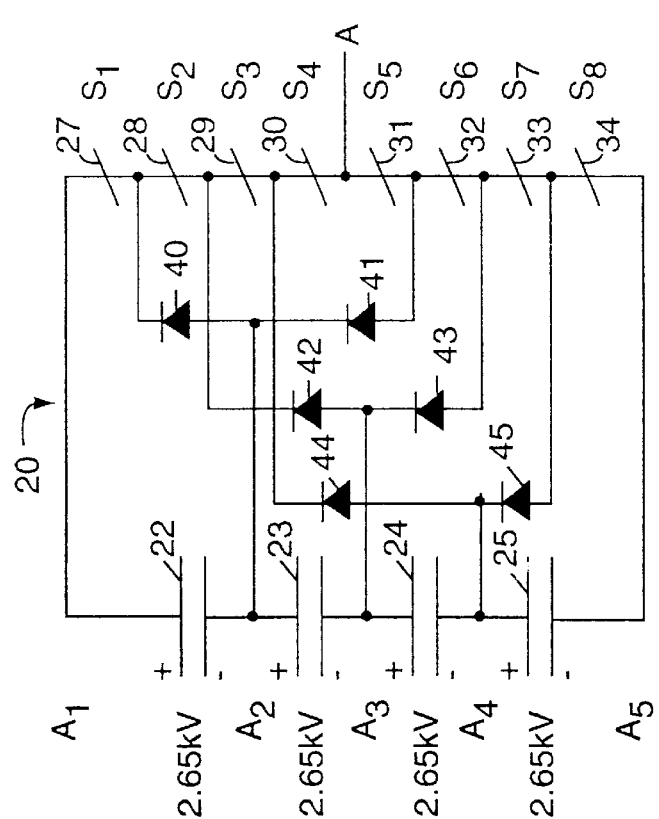
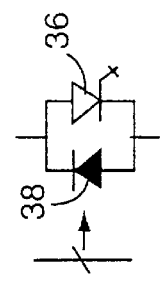
FIG. 2 (Prior Art)
FIG. 1 (Prior Art)

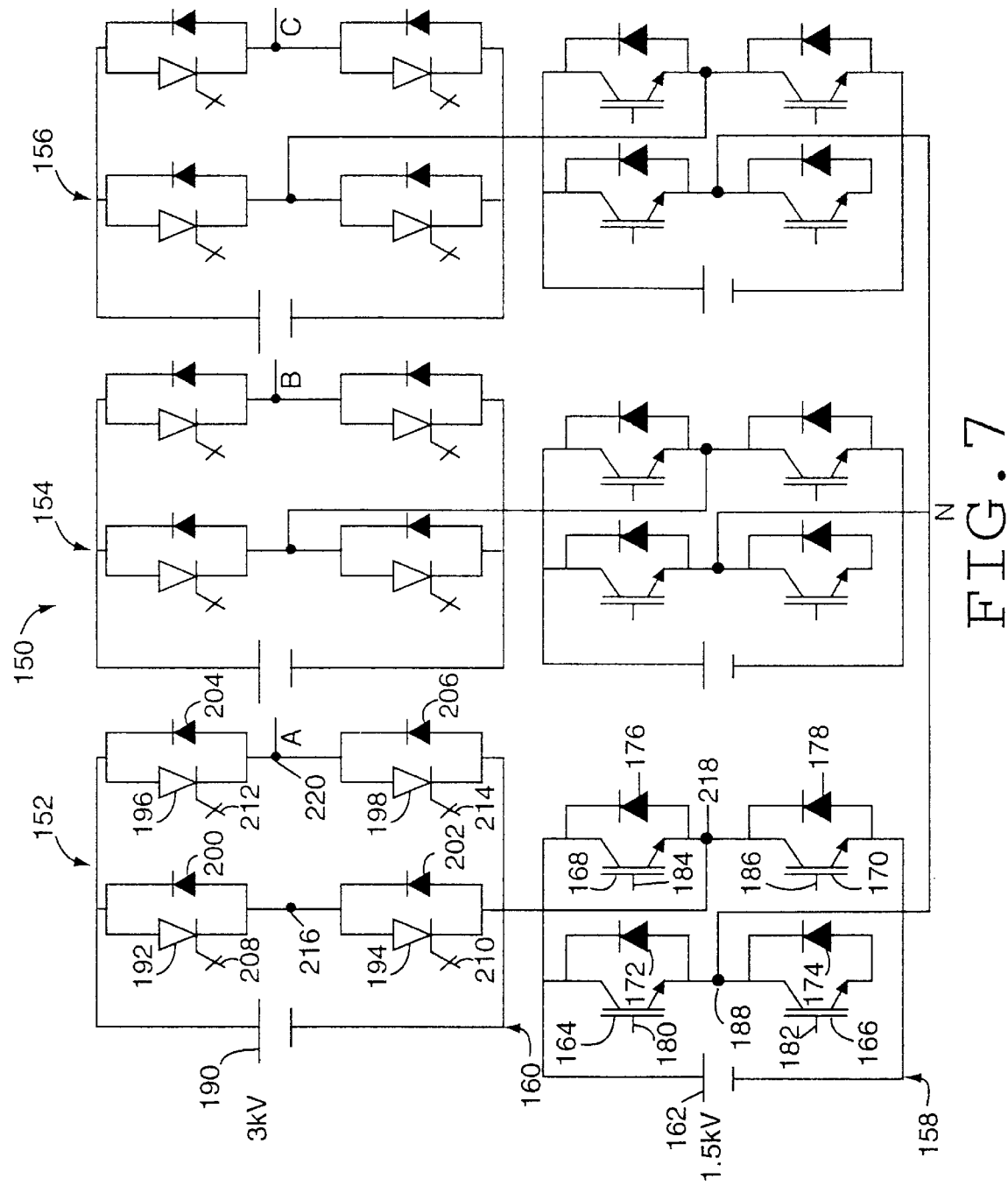

HYBRID TOPOLOGY FOR MULTILEVEL POWER CONVERSION

This application claims the benefit of U.S. Provisional Application Ser. No. 60/074,679, filed Feb. 13, 1998.

This invention was made with United States government support awarded by the following agencies: NSF Grant No.: ECS-9510115. The United States has certain rights in this invention.

FIELD OF THE INVENTION

This invention pertains generally to electric power conversion systems, and, more particularly, to multilevel power conversion systems for high voltage and high power applications.

BACKGROUND OF THE INVENTION

Low voltage AC power signals, i.e., up to approximately 1 kV, are typically synthesized using conventional power converters which employ insulated gate bipolar transistor (IGBT) switching devices. The switching devices are connected together in a bridge configuration and are controlled to synthesize a single phase or multi-phase AC output signal at a selected frequency and voltage, current, or power level from either a DC signal or an AC signal at a different frequency or at a different voltage, current, or power level. IGBT switching devices may be modulated at a high frequency, e.g., 10–20 kHz, which is typically well above the fundamental frequency of the AC output waveform being synthesized. Pulse width modulation or other similar high frequency modulation techniques may thus be used to control the IGBT switching devices in conventional power converters. The spectral performance of conventional power converters is typically excellent due to this high frequency modulation of the converter switching devices. High frequency modulation of the switching devices in the conventional power converter allows a nearly sinusoidal AC output waveform to be generated which, with minimal passive filtering on the output of the converter, includes very little harmonic, i.e., non-fundamental, frequency content.

Conventional power converters employing IGBT switching devices cannot be used, however, to synthesize high voltage output signals, beyond about 2 kV. This limitation is due to the limited voltage blocking capability, less than 1.5 kV, of most commercially available IGBTs. For high output voltage levels, up to 5 kV, converters employing gate turn-off (GTO) thyristor switching devices can be used. GTO thyristors have much higher voltage blocking capability than IGBTs. However, the switching capability of GTO thyristors is limited. GTO thyristors typically cannot be switched at a frequency much higher than the fundamental frequency of the output signal to be synthesized. Thus, the spectral performance of a high voltage converter employing GTO thyristors is limited. A GTO thyristor converter can only provide harmonic performance similar to an IGBT based converter if an immense, and typically prohibitive, amount of filtering is employed.

There is a growing demand for high voltage power conversion systems capable of providing high voltage output signals and having good spectral performance and control. For example, such a system would be a useful power supply for high voltage electric powered traction locomotives and other transportation systems which are currently in operation in Europe and which are planned for introduction in the United States. Another application for high voltage power conversion systems is harmonic compensation and active filtering in electric power distribution systems. Certain industrial customers of electric power utilities can produce harmonics in the entire electric distribution system. Such harmonics can damage distribution equipment, require the overrating of such equipment, and adversely affect the operations of other industrial customers of the utility. An example of such a "dirty load" is a steel mill operation, wherein rectifiers are used to develop DC bus voltages used in the mill. The switching frequency of the rectifiers can be reflected back onto the power lines providing power to the mill, thereby generating harmonics in the power distribution system. A passive filtering system, composed of capacitors and inductors, may be used to reduce the harmonics fed back into the power distribution system from such a load. However, it has been found that an inverter, either by itself or in combination with passive filtering components, may be controlled to provide harmonic compensation and filtering of such loads. Such "active filtering" can be highly effective in eliminating harmonics from the electric power distribution system. Unlike purely passive filter components, an active filter inverter can be controlled dynamically to respond to changing conditions on the electric power distribution system. It is apparent that, for high voltage active filtering applications in particular, a high voltage power converter having good and controllable spectral performance is required.

A known method for achieving high output voltage levels from a power conversion system is to employ a multilevel power converter topology. The number of converter levels required in any such multilevel topology depends on the output voltage level desired and the type of switching devices employed in the converter. Higher voltage levels can be achieved with fewer converter levels if GTO thyristors are employed in the converter. However, a multilevel converter employing GTO thyristors will have poor spectral performance. Alternatively, a greater number of converter levels, with IGBT switching devices employed in each level, may be employed to achieve a high voltage output level without sacrificing spectral performance. However, increasing the number of converter levels also increases converter circuit control complexity and cost.

An example of a known multilevel converter topology is the diode clamped inverter. An exemplary diode clamped multilevel inverter 20 is illustrated in, and will be described with reference to, FIG. 1. FIG. 1 illustrates a single phase of a three phase diode clamped multilevel inverter. The remaining two phases will have a similar configuration, and share the same DC bus. The exemplary diode clamped inverter 20 includes four DC bus capacitors 22–25 connected in series to form a quadruple DC bus. All of the capacitors 22–25 are identical, and the DC voltage level across each of the capacitors 22–25 is equal. In the present example, the voltage level across each capacitor 22–25 is 2.65 kV. Eight inverter switching devices, 27–34, hereinafter $S_1$–$S_8$, are individually connected in series. The group of series connected switching devices $S_1$–$S_8$ is connected across the series connected DC bus capacitors 22–25. In this case, each switching device 27–34 is implemented as a GTO thyristor 36 and a diode 38 connected in anti-parallel with the GTO thyristor 36. Five tapping points $A_{1-5}$ are defined along the quadruple DC bus. Tapping points $A_1$ and $A_5$ are at the ends of the quadruple DC bus, and tapping points $A_2$, $A_3$ and $A_4$ are defined at the connecting points between capacitors 22 and 23, 23 and 24, and 24 and 25, respectively. Clamp diodes 40–45 are connected between the tapping points $A_2$, $A_3$ and $A_4$ along the quadruple DC bus and selected points between the series connected switching devices 27–34.

Clamp diodes 40 and 41 are connected between tapping point $A_2$ and points between switching devices $S_1$ and $S_2$, and $S_5$ and $S_6$, respectively. Clamp diodes 42 and 43 are connected between tapping point $A_3$ and points between switching devices $S_2$ and $S_3$, and $S_6$ and $S_7$, respectively. Clamp diodes 44 and 45 are connected between tapping point $A_4$ and points between switching devices $S_3$ and $S_4$, and $S_7$ and $S_8$, respectively.

It may be observed from FIG. 1 that a five-level output waveform can be synthesized at output node A, between switching devices $S_4$ and $S_5$, by tapping the five tapping points $A_{1-5}$ on the quadruple DC bus. Thus, the diode clamped inverter circuit can be thought of as a multiplexer, with switching devices $S_1$–$S_8$ for connecting the output node A to one of five available voltage levels. A peak voltage of, in this case, +/−5.3 kV can be realized by clamping the output node A to the top tapping point $A_1$ or bottom tapping point $A_5$ of the DC bus. This is accomplished by closing a set of four switches, either $S_1$–$S_4$, or $S_5$–$S_8$, for obtaining output voltage levels of +5.3 kV or −5.3 kV, respectively. The other three "inner" voltage levels, in this case, 2.65 kV, 0, and −2.65 kV, can be synthesized by closing switching devices $S_2$–$S_5$, $S_3$–$S_6$, or $S_4$–$S_7$, respectively. This creates a current path connecting two of the clamp diodes cathode-to-anode. The other ends of these clamp diodes are connected to one of the voltage-taps $A_2$, $A_3$, or $A_4$, along the DC bus. For example, to realize the 2.65 kV voltage level at the output A of the diode clamped inverter 20, switching devices $S_2$–$S_5$ are closed, connecting the cathode of clamp diode 40 to the anode of clamp diode 41 at output node A. The anode of clamp diode 40 and cathode of clamp diode 41 are connected to tapping point $A_2$ on the quadruple DC bus. Thus, with switching devices $S_2$–$S_5$ closed, the voltage across DC bus capacitor 23 is connected, via clamp diodes 40 and 41, to the output node A. These diodes also prevent the undesired voltage levels across the other DC bus capacitors from being connected to the output node A.

It has been demonstrated that a diode clamped inverter topology can be used to synthesize three phase line-to-line AC voltage levels of up to 7.46 kV using 4.5 kV GTO thyristor switching devices. However, since, as discussed previously, the switching capability of GTO thyristors is limited at higher frequencies, the spectral performance of such a configuration is limited. IGBT switching devices may be employed in the diode clamped inverter topology to improve spectral performance. However, in order to achieve high output voltage levels using such switching devices, the diode clamped inverter topology must have numerous levels. Although the diode clamped inverter topology works well up to four or five levels, the topology becomes highly cumbersome and difficult to realize beyond this number of levels. It should be noted that the required reverse voltage blocking capability of the clamp diodes in the diode clamped inverter varies with the voltage level at which the diode is employed. Also, it has been demonstrated that for induction machine drive applications the DC bus of a diode clamped inverter is loaded non-uniformly, causing an additional problem of DC bus capacitor voltage balancing.

An example of a variation of the five-level diode clamped inverter topology 20 which provides a solution to the DC bus capacitor voltage balancing problem is the exemplary four-level diode clamped rectifier-inverter topology 50 illustrated in FIG. 2. A single phase of a multi-phase four-level diode clamped rectifier-inverter is illustrated. The remaining phases will have a similar configuration. In order to achieve capacitor voltage balancing, a diode clamp structure is employed on both rectifier and inverter sides of a DC bus.

The four-level diode clamped rectifier-inverter 50 includes a triple DC bus formed of three DC bus capacitors 52–54 connected together in series. Rectifier side switching devices 56–61 and inverter side switching devices 62–67 are connected together in series across the triple DC bus. In this case, each switching device 56–67 may be implemented as an IGBT 68 with a diode 70 connected in anti-parallel with the IGBT 68. Rectifier side clamp diodes 72 and 73 are connected between a tapping point on the DC bus between DC bus capacitors 52 and 53 and points between rectifier side switching devices 56 and 57, and 59 and 60, respectively. Rectifier side clamp diodes 74 and 75 are connected between a tapping point on the DC bus between DC bus capacitors 53 and 54 and points between rectifier side switching devices 57 and 58, and 60 and 61, respectively. Inverter side clamp diodes 76 and 77 are connected between the tapping point on the DC bus between DC bus capacitors 52 and 53 and points between inverter side switching devices 62 and 63, and 65 and 66, respectively. Inverter side clamp diodes 78 and 79 are connected between the tapping point on the DC bus between DC bus capacitors 53 and 54 and points between inverter side switching devices 63 and 64, and 66 and 67, respectively.

The rectifier side switching devices 56–61 are controlled to provide rectification of an input voltage signal provided on input node Ain, between rectifier side switching devices 58 and 59, to ensure that a balanced voltage level V is maintained across each DC bus capacitor 52–54. The inverter side switching devices 62–67 are controlled in a manner similar to that of the switching devices in the five-level diode clamped inverter 20 discussed previously. In this case, a four-level waveform may be realized from the triple DC bus, which allows four distinct voltage levels, +2V, +V, −V, and −2V. A set of three of the inverter switching devices 62–67 is closed at any given time to connect the output node $A_{out}$, between inverter side switching devices 64 and 65, to one of the four tapping point voltage levels along the triple DC bus. Switching devices 62–64 are closed to provide voltage level +2V at the output node $A_{out}$, switching devices 63–65 are closed to provide voltage level +V at output node $A_{out}$, switching devices 64–66 are closed to provide voltage level −V at output node $A_{out}$, and switching devices 65–67 are closed to provide voltage level −2V at output node $A_{out}$.

Although providing a solution to the problem of DC bus capacitor voltage balancing for induction machine drive applications, the four-level diode clamped rectifier-inverter topology 50 is limited by the other limitations of the diode-clamped inverter topology discussed previously. Although the switching devices 56–67 in such a topology may be implemented with IGBTs, which may be switched at a high switching frequency to provide good spectral performance, the use of IGBT switching devices limits the output voltage level of the converter. Numerous levels must be emloyed if IGBTs are to be used for high voltage level applications. The diode clamped topology makes it cumbersome and difficult to realize such a rectifier-inverter beyond four or five levels. Higher output voltage levels can be achieved with fewer inverter levels if GTO thyristor switching devices are employed in the converter topology. However, the limited switching capability at high frequency of GTO thyristors will result in a converter which has poor spectral performance.

As discussed previously, in multilevel diode clamped inverter topologies the required voltage blocking capability of the clamp diodes varies with the level at which the diodes are employed in the circuit topology. Thus, multiple clamp diodes connected in series may be required at higher voltage levels. In order to avoid this requirement, an alternative multilevel inverter structure where the voltage across an open switch is constrained by clamping capacitors, instead of clamp diodes, has been proposed. These inverters are commonly known as flying capacitor inverters. Flying capacitor topology inverters, however, suffer from the other limitations of diode clamped inverter topologies. Poor spectral performance will result if GTO thyristor devices are used to implement the switching devices in the flying capacitor inverter topology. Better spectral performance can be achieved if IGBTs are used for the flying capacitor inverter switching devices. However, once again, numerous levels of IGBT switching devices must be employed to synthesize high voltage level output signals. Although the flying capacitor inverter topology works well for topologies having up to four or five voltage levels, the flying capacitor inverter topology is highly cumbersome to scale for more than this number of levels.

Multiple single phase inverters may be used to synthesize multilevel waveforms. Using multiple single phase inverters to synthesize multilevel waveforms was initially realized through phase shifting of multiple single phase inverter output voltage waveforms and adding the phase shifted waveforms vectorially using series connected transformer windings. However, when the number of phases increases beyond three or five, this approach becomes difficult to realize due to the requirement of multiple transformer windings.

As an alternative approach, a series connection of multiple single phase *inverters with multiple dedicated DC buses may be used to realize multilevel output waveforms. An example of such a modular approach for synthesizing multilevel waveforms is the H-bridge multilevel inverter. An exemplary known modular H-bridge multilevel inverter circuit topology 80 is illustrated in FIG. 3. In the H-bridge multilevel inverter approach, a number of full bridge single phase inverters, with dedicated isolated DC bus capacitors/voltage sources, are connected together in series to form a high voltage inverter for each phase of a multi-phase system. In the exemplary H-bridge multilevel inverter topology 80 illustrated in FIG. 3, two such single phase inverters 82 and 84 are connected in series to form a single phase of a three-phase inverter. (The remaining two phases have a similar configuration and respective independent DC voltage sources.) The first single phase inverter 82 includes a DC voltage source 86 and four inverter switching devices 88–91 connected in an H-bridge configuration across the DC voltage source 86. The second H-bridge inverter 84 includes a DC voltage source 92 and four inverter switching devices 94–97 connected together in an H-bridge configuration across the voltage source 92. The node A between switching devices 88 and 89 of a second leg of the first H-bridge inverter 82 is the output node for this phase of the multi-phase inverter. The node between inverter switching devices 96 and 97 of a first leg of the second H-bridge inverter 84 is connected to the neutral line of the multi-phase inverter. The first 82 and second 84 H-bridge inverters are connected together at a node between switching devices 90 and 91 of a first leg of the first H-bridge inverter 82 and a node between switching devices 94 and 95 of a second leg of the second H-bridge inverter 84. Each of the inverter switching devices 88–91 and 94–97 may be implemented as an IGBT switching device 98 and a diode 100 connected in anti-parallel with the IGBT switching device 98. The voltages across the DC voltage sources 86 and 92 are equal. It may be seen that the H-bridge multilevel inverter 80 is capable of producing five distinct voltage levels (+/−2V, +/−V, and 0V) at output node A. For example, with switching devices 97, 94, 91, and 88 closed, an output voltage level of +2V is provided at output node A. Other switching combinations are employed to provide the other voltage levels at the output node A. Thus, the H-bridge multilevel inverter 80 may be controlled to provide a five level output voltage waveform 102, as illustrated in FIG. 4. (Waveform 104 is the desired AC signal to be synthesized.)

The advantage of the H-bridge multilevel inverter topology is that its modular configuration provides flexibility for easy expansion of the number of levels without introducing undue complexity in the power circuit. This topology requires the same number of switches as in a diode clamped inverter topology to achieve a given number of (odd) voltage levels. However, the H-bridge multilevel inverter topology requires multiple dedicated DC buses, which makes it an expensive solution. On the other hand, since the DC bus voltage sources are independent, the problem of capacitor voltage balancing is eliminated.

SUMMARY OF THE INVENTION

The present invention provides a multilevel power converter. Each level of a multilevel inverter in accordance with the present invention includes a DC voltage source providing a DC source voltage level which is different from the source voltage level provided by at least one of the DC voltage sources of one of the other levels. Preferably, the different DC source voltage levels are multiples of each other. For example, a multilevel inverter in accordance with the present invention may include a set of cascaded inverters connected in series, with the DC source voltage levels provided by the DC voltage sources of each inverter varying in a binary fashion. For n such cascaded inverters with DC source voltage levels varying in binary fashion, a multilevel inverter in accordance with the present invention can achieve $2^{n+1}-1$ distinct output voltage levels. For such a cascaded multilevel inverter wherein the DC source voltage levels of the cascaded inverters vary in a geometric progression with a factor of three, a multilevel inverter with n cascaded inverters can achieve $3^n$ distinct output voltage levels.

In accordance with the present invention, low voltage high speed switching is combined with high voltage low frequency switching. Such a hybrid control strategy takes advantage of the respective operating features of high speed switching devices, such as IGBTs, and high voltage switching devices, such as GTO thyristors, to provide a high voltage output waveform with good spectral characteristics. High voltage switching devices, such as GTOs, are employed in levels of the multilevel inverter having high voltage DC voltage sources. The high voltage switching devices are modulated at a low frequency, such as the fundamental frequency of the output voltage waveform to be synthesized. Low voltage switching devices, capable of high switching frequency operation, such as IGBTs, are employed in a level of the multilevel inverter having the lowest voltage DC voltage source. The low voltage switching devices are modulated at a high frequency using pulse width modulation or a similar high frequency modulation technique. The resulting low voltage high frequency signal is combined with the low frequency high voltage signal generated by the high voltage levels of the multilevel inverter to synthesize a high voltage output signal with good spectral characteristics.

The general concepts of the present invention, with suitable modifications, are extendable to various multilevel inverter topologies, such as diode clamped and flying capacitor inverters. However, the preferred multilevel inverter topology is a modified H-bridge multilevel inverter topology. An H-bridge multilevel inverter in accordance with the present invention may be used to synthesize a single phase or multi-phase high voltage AC waveform with good spectral characteristics. Each phase of a multi-phase inverter in accordance with the present invention preferably includes a set of multiple H-bridge inverters cascaded together, i.e., connected in series. The circuit structure for a single phase inverter in accordance with the present invention is similar to that of the circuit structure for one phase of a multi-phase inverter in accordance with the present invention. Each H-bridge inverter in the set of cascaded inverters preferably includes an independent DC voltage source and four inverter switching devices connected in an H-bridge configuration across the DC voltage source. Each such H-bridge inverter DC voltage source provides a DC source voltage level which is different from at least one of the DC source voltage levels provided by the DC voltage sources of other H-bridge inverters in the set of cascaded inverters. Preferably, the different DC source voltage levels are multiples of each other. For example, the DC source voltage outputs of the DC voltage sources may vary in a binary fashion, i.e., if the first, lowest, DC voltage source output is V, the voltage level output of the DC voltage source in the next H-bridge inverter in the set of cascaded inverters is 2V, etc. For n such cascaded inverters, with DC source voltage levels varying in binary fashion, $2^{n+1}-1$ distinct output voltage levels can be achieved. Alternatively, the DC source voltage outputs of the DC voltage sources may vary in a geometric progression with a factor of three, i.e., if the first, lowest, DC source voltage level is V, the voltage level output of the DC voltage source in the next H-bridge inverter in the set of cascaded inverters is 3V, etc. For n such cascaded inverters, with DC voltage levels varying in a geometric progression with a factor of three, $3^n$ distinct output voltage levels can be achieved.

Each H-bridge inverter in the set of cascaded inverters may include four switching devices connected in an H-bridge configuration across an independent DC voltage source. A node between two switching devices in one leg of the H-bridge of one of the H-bridge inverters in the set of cascaded inverters is the modified H-bridge multilevel inverter output node. For a multi-phase inverter, this output node is the output node of one phase of the inverter output. For a multi-phase inverter, a node between two switching devices in one leg of another of the H-bridge inverters in the set of cascaded inverters is connected to other such nodes in the other sets of cascaded inverters forming the other phases of the multi-phase inverter. These connected nodes form a neutral node for the multi phase inverter. The other H-bridge inverters in the set of cascaded inverters are connected together in a cascaded fashion, i.e., a node between two switching devices of a first leg of each such H-bridge inverter is connected to a node between two switching devices of a second leg of the previous H-bridge inverter in the set of cascaded inverters, and a node between two inverter switching devices in a second leg of the H-bridge inverter is connected to a node between two switching devices in a first leg of the next H-bridge inverter in the set of cascaded inverters.

In accordance with the present invention, the inverter switching devices in a hybrid H-bridge multilevel inverter in accordance with the present invention may be implemented as IGBTs or GTO thyristors. These switching devices are controlled to synthesize the desired output voltage waveform on the output node of the inverter. Preferably, GTO thyristor switching devices are employed in the H-bridge inverters in the set of cascaded inverters which have DC voltage sources which provide high DC source voltage levels. IGBTs preferably are employed in the H-bridge inverter in the set of cascaded H-bridge inverters which has a DC voltage source providing the lowest DC source voltage level. To provide an output signal at the desired high voltage level, the high voltage GTO switching devices are modulated at a low frequency to generate a stepped waveform output at near the fundamental frequency of the desired output voltage waveform. The IGBT switching devices are modulated to generate a high frequency pulse width modulated waveform, at a lower voltage level, which is combined with the high voltage stepped waveform to synthesize a desired high voltage AC waveform with excellent spectral characteristics.

The present invention thus features a hybrid modulation strategy, which incorporates stepped synthesis in conjunction with high frequency variable pulse width modulation. Under this modulation strategy, while a high voltage inverter is modulated to switch only at a fundamental frequency of the inverter output, a lower voltage inverter is switched at a higher frequency, thereby providing improved output waveform quality. With the hybrid modulation strategy of the present invention, the effective spectral performance of the output depends on the high frequency switching, while the overall voltage generation capability is determined by the voltage ratings of the switching devices employed in the high voltage low frequency inverter, which can be much higher than those of the high frequency switching devices employed in the low voltage inverter.

Beside making possible the synthesis of high voltage high quality output voltage waveforms, a modified H-bridge multilevel inverter in accordance with the present invention offers several other advantages over existing multilevel power conversion topologies. Since the modular structure of a conventional multilevel H-bridge inverter is maintained, a modified H-bridge multilevel inverter in accordance with the present invention is easily extendable to higher voltage levels and faster dynamics. Since each level of the modified H-bridge multilevel inverter features an independent DC voltage source, capacitor voltage balancing is easily achieved, enhancing the fault tolerance capability of the converter. For a given number of output levels, a modified H-bridge multilevel inverter in accordance with the present invention can be implemented with fewer switching devices than other existing multilevel power conversion topologies. This reduces the cost and adds to the reliability of a power converter in accordance with the present invention. With a geometric progression arrangement of DC voltage sources, a modified H-bridge multilevel inverter in accordance with the present invention offers the possibility of an exponential increase in the number of output voltage levels provided with each H-bridge inverter level added to the set of cascaded inverters which forms the modified H-bridge multilevel inverter.

A multilevel inverter in accordance with the present invention may be employed in any single phase or multi-phase power conversion application. The present invention will prove particularly useful in applications requiring the synthesis of high voltage AC signals with excellent spectral characteristics. Such applications include the providing of electrical power for traction locomotives and other transportation systems, active filtering to provide harmonic compensation in industrial electric power distribution systems, and reactive power compensation at distribution and transmission levels.

9

Further objects, features, and advantages of the present invention will be apparent from the following detailed description in conjunction with the accompanying drawings.

BRIEF DESCRIPTION OF THE DRAWINGS

FIG. 1 is a simplified schematic circuit diagram of a single phase of a five-level diode clamped inverter known in the prior art.

FIG. 2 is a simplified schematic circuit diagram of a single phase of a four-level diode clamped rectifier-inverter as known in the prior art.

FIG. 7 is a simplified schematic circuit diagram of an exemplary three phase hybrid seven-level output modified H-bridge inverter in accordance with the present invention.

DETAILED DESCRIPTION OF THE INVENTION

Figure 4:
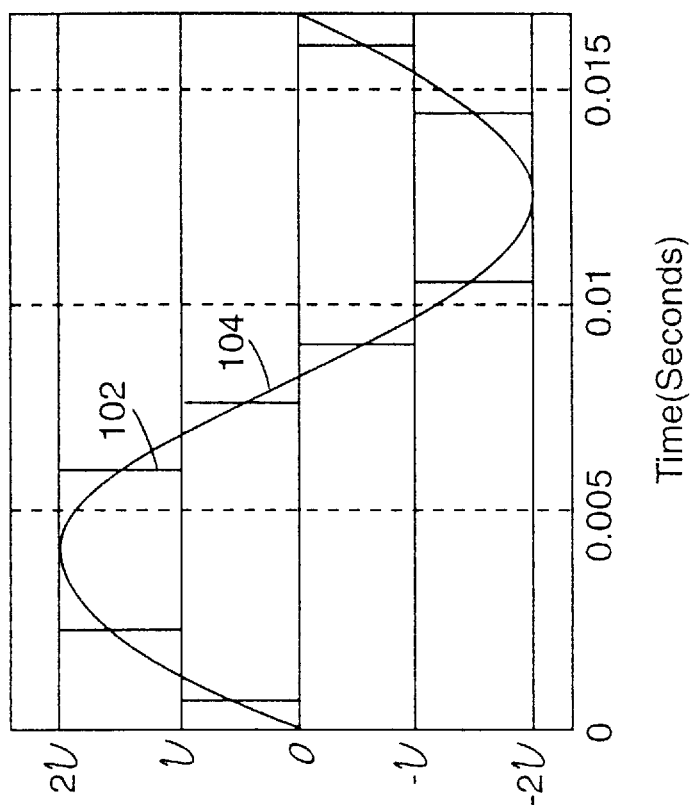
FIG. 4 is a waveform diagram illustrating an exemplary output voltage waveform of the multilevel inverter of FIG. 3.
Figure 3:
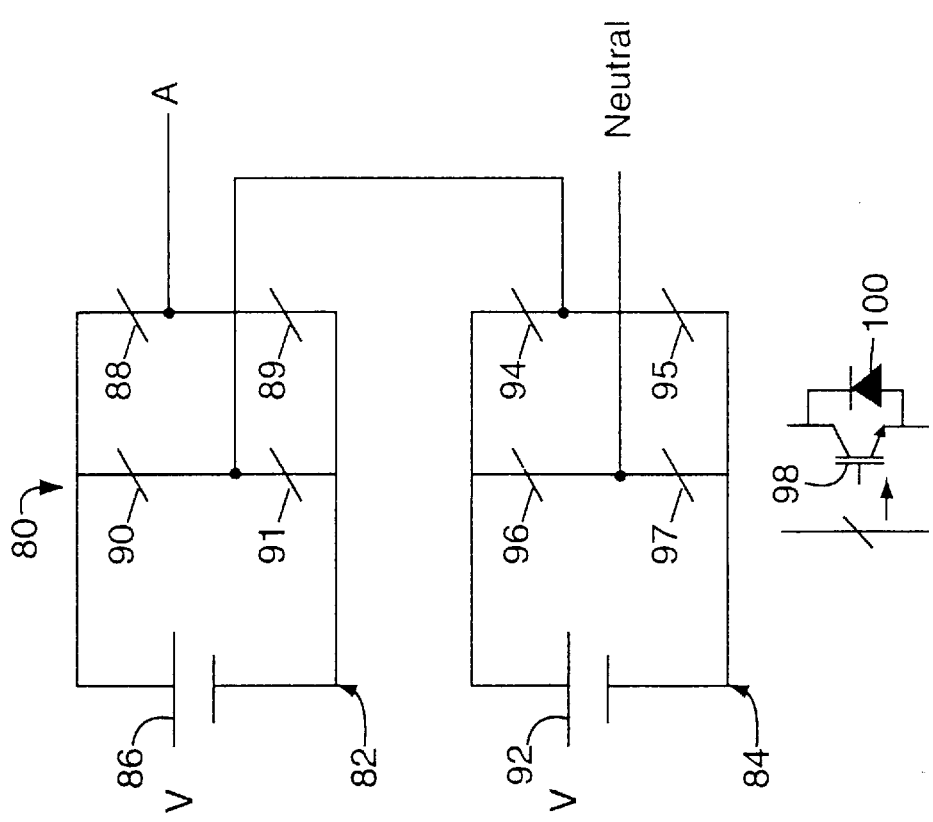
FIG. 3 is a simplified schematic circuit diagram of a single phase of a five-level H-bridge multilevel inverter with two equal DC source voltage levels as known in the prior art.

The present invention provides a multilevel power converter having discrete voltage sources for each converter level, wherein the discrete voltage sources provide non-equal source voltage levels. The generalized concept of the present invention, with suitable modifications, is applicable to various multilevel inverter topologies, such as diode clamped and flying capacitor inverters. The present invention will be described in detail herein with reference to the exemplary and preferred embodiment of a modified H-bridge multilevel inverter topology, although the invention is not necessarily limited to such a topology.

A simplified schematic circuit diagram of a multi-phase modified H-bridge multilevel inverter in accordance with the present invention 110 is illustrated in, and will be described with reference to, FIG. 5. The exemplary modified H-bridge multilevel inverter 110 is a three-phase inverter having three-phase inverter outputs A, B, and C. In accordance with the present invention, an AC output signal is synthesized on each phase output A, B, and C by a set of cascaded, i.e., series connected, H-bridge inverters 112, 114, and 116, respectively. The three sets of cascaded H-bridge inverters 112, 114, and 116 are joined together at a node N which forms the neutral point for the three phase inverter 110. Note that a modified H-bridge multilevel inverter in accordance with the present invention may also be used to provide a single phase AC output waveform signal. For single phase applications, a modified H-bridge multilevel inverter in accordance with the present invention would feature a single set of cascaded H-bridge inverters, such as one of the sets of cascaded H-bridge inverters 112, 114, or 116, forming the multi-phase inverter 110.

Each set of cascaded H-bridge inverters 112, 114, and 116 includes n cascaded H-bridge inverters 112(1-n), 114(1-n), and 116(1-n), respectively. In accordance with the present invention, the number of cascaded H-bridge inverters in each set of cascaded H-bridge inverters 112, 114, and 116 is greater than or equal to n=2. The circuit structure of each set of cascaded H-bridge inverters 112, 114, and 116 is the same. Therefore, the circuit structure of only one set of cascaded H-bridge inverters 112 will be described in detail herein. The circuit structure of the other two sets of cascaded H-bridge inverters 114 and 116 is identical.

Each H-bridge inverter 112(1-n) within the set of cascaded H-bridge inverters 112 may be implemented using a conventional four switching device H-bridge inverter structure. Each H-bridge inverter 112(1-n) within the set of cascaded H-bridge inverters 112 may preferably be implemented using the same basic H-bridge inverter structure. Therefore, only one of the H-bridge inverters 112(1) will be described in detail herein. The other H-bridge inverters 112(2-n), 114(1-n), and 116(1-n) will have the same basic H-bridge circuit structure.

The basic H-bridge inverter topology employed throughout the H-bridge multilevel inverter 110 includes a DC voltage source 118 and four inverter switching devices 120, 122, 124, and 126 connected in an H-bridge configuration across the DC voltage source 118. Switching devices 120 and 122 are connected together in series across the DC voltage source 118 to form a first leg of the H-bridge. Inverter switching devices 124 and 126 are connected together in series across the DC voltage source 118 to form a second leg of the H-bridge. For the three phase modified H-bridge multilevel inverter 110, the connecting point between series connected switching devices 120 and 122 in the first leg of the H-bridge inverter 112(1) is connected to the neutral point N. The connecting point between series connected inverter switching devices 124 and 126 in the second leg of the H-bridge inverter 112(1) is connected to a connecting point between two series connected switching devices in a first leg of the next H-bridge inverter 112(2) in the set of cascaded H-bridge inverters 112. In turn, a connecting point between series connected inverter switching devices in a second leg of the second H-bridge inverter 112(2) in the set of cascaded H-bridge inverters 112 is connected to a connecting point between switching devices in a first leg of the third H-bridge inverter 112(3) in the set of cascaded H-bridge inverters 112. This connection scheme is repeated to connect the n H-bridge inverters 112(1-n) in the set of cascaded inverters 112 in series with each other. The phase output A of the set of cascaded H-bridge inverters 112 is connected to a connecting point between inverter switching devices in a second leg of the last H-bridge inverter 112(n) in the set of cascaded H-bridge inverters 112.

The DC voltage source 118 in the first H-bridge inverter 112(1) in the set of cascaded H-bridge inverters 112 may be implemented using any conventional AC-to-DC converter topology for generating a DC source voltage level V for the H-bridge inverter 112(1) from an AC voltage source. Alternatively, a DC voltage source such as a battery may be used to provide the DC source voltage V for the H-bridge inverter 112(1).

Each H-bridge inverter 112(1-n) in the set of cascaded H-bridge inverters 112 has its own independent DC voltage source. In accordance with the present invention, at least one of the DC voltage sources in the set of cascaded H-bridge inverters 112 provides a DC source voltage level which is different from the source voltage level provided by the DC voltage source 118 in the first H-bridge inverter 112(1). Preferably, the DC voltage source 128 of the second H-bridge inverter 112(2) in the set of cascaded H-bridge inverters 112 provides a DC source voltage level which is different from the DC source voltage level provided by the DC voltage source 118 in the first H-bridge inverter 112(1). Similarly, the AC voltage source 130 in the third H-bridge inverter 112(3) in the set of cascaded H-bridge inverters 112, preferably, provides a source voltage level which is different from the source voltage levels provided by the DC voltage sources in the first and second H-bridge inverters 112(1) and 112(2). Thus, in accordance with the present invention, the source voltages provided by the DC voltage sources of the H-bridge inverters 112(1-n) preferably are unequal.

Preferably, the DC source voltage levels provided by the DC voltage sources in the H-bridge inverters 112(1-n) in the set of cascaded H-bridge inverters 112 are multiples of each other. For example, the DC source voltage levels provided by the DC voltage sources in the H-bridge inverters 112(1-n) of a set of cascaded H-bridge inverters may vary in a binary fashion. Thus, as illustrated in FIG. 5, if the DC source voltage level provided by the DC voltage source 118 in the first H-bridge inverter 112(1) in the set of cascaded H-bridge inverters 112 is V, the DC source voltage level provided by the DC voltage source 128 in the second cascaded H-bridge inverter 112(2) is 2V, the DC source voltage level provided by the DC voltage source 130 in the third cascaded H-bridge inverter 112(3) is 4V, and, in general, the DC source voltage provided by the DC voltage source 132 in the nth cascaded H-bridge inverter 112(n) is $2^{n-1}$V. It should be understood that H-bridge inverters having DC voltage sources which produce source voltage levels which vary in a binary fashion may be connected together in any order, not just in the order illustrated in FIG. 5.

Figure 6:
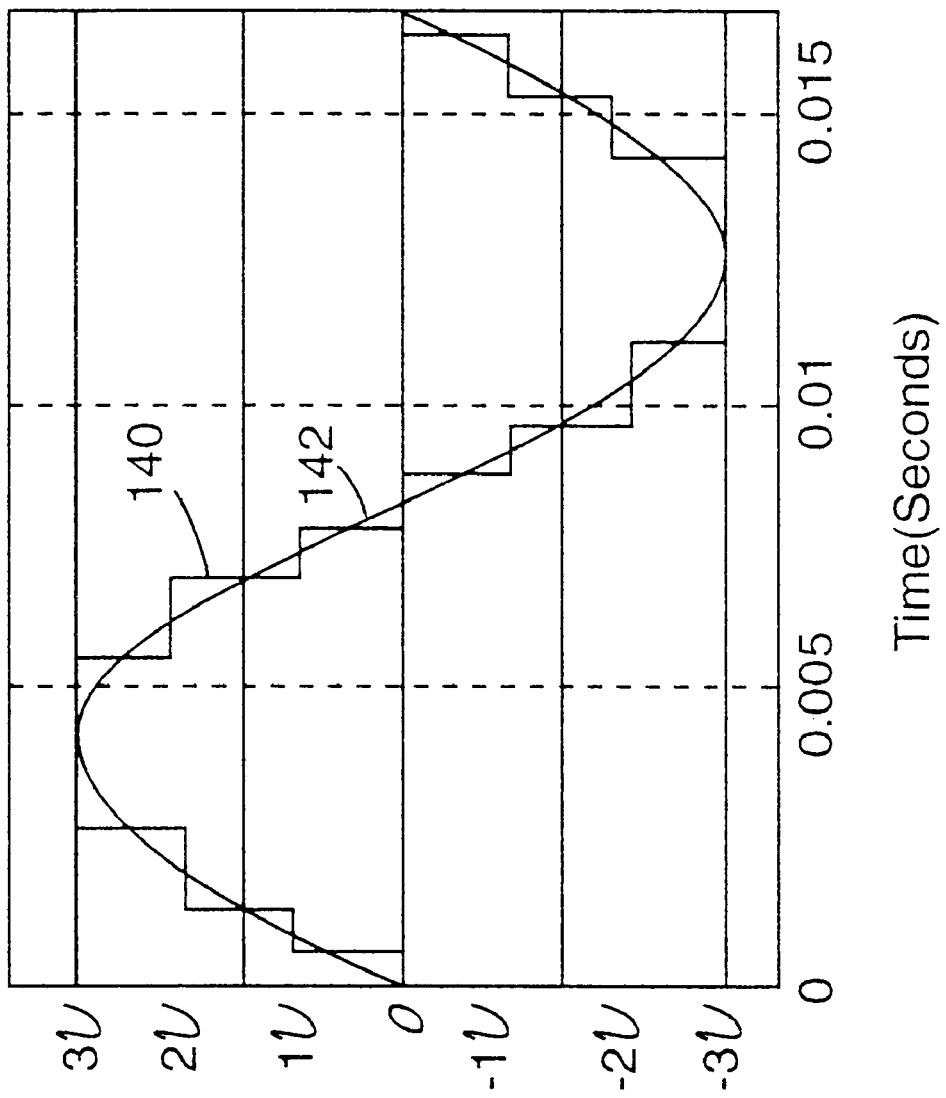
FIG. 6 is a waveform diagram illustrating an exemplary output voltage waveform which may be provided by a seven-level output inverter in accordance with the present invention having two independent DC voltage sources providing DC source voltage levels arranged in a binary progression.

For n cascaded inverters 112(1-n), with DC source voltage levels varying in a binary fashion, one can achieve $2^{n+1}-1$ distinct voltage levels at the phase output A of the set of cascaded inverters 112 by controlling the inverter switching devices in the H-bridge inverters 112(1-n) in an appropriate manner. For example, it is possible to obtain output voltage levels of 0V, +/−1V, +/−2V, and +/−3V, i.e., 7 levels, with only two H-bridge inverter levels having DC voltage sources providing DC source voltage levels V and 2V. An exemplary seven level output voltage waveform 140 which may be provided by such a multilevel inverter topology is illustrated in FIG. 6. (Waveform 142 is the desired AC signal to be synthesized.) A conventional multilevel H-bridge inverter topology, having equal DC source voltage levels in each level of the inverter, would require three such inverter levels to achieve the same number of output voltage levels. It may be observed that, for a given number of inverter switching devices and DC buses (or DC bus capacitors), more output voltage levels can be obtained using a modified H-bridge multilevel inverter topology having DC source voltage levels varying in a binary fashion than can be obtained using any of the other multilevel inverter topologies discussed previously. A comparison of these other inverter topologies with the inverter topology just discussed is presented in Tables 1 and 2. Table 1 shows the relationship between the number of primary devices (diodes are not included) and DC buses (or DC bus capacitors) and number of output voltage levels obtained for each topology. Table 2 shows the number of primary devices and DC buses (or DC bus capacitors) required by each topology to achieve seven output voltage levels. Tables 1 and 2 show that a modified H-bridge multilevel inverter topology with DC source voltage levels varying in a binary fashion may be implemented with fewer components, and therefore with less complexity and cost and greater reliability, than previously known multilevel inverter topologies. (Note that Tables 1 and 2 show primary device and DC bus (capacitor) quantities for three-phase inverter topologies.)

TABLE 1

Comparison of Topologies for Multilevel Inverters

| Topology | Primary Devices | DC Buses (Capacitors) | Output Levels |
| --- | --- | --- | --- |
| Diode Clamped | 6N | N | N + 1 |
| Flying Capacitor | 6N | 3N − 2 | N + 1 |
| Conventidnal H-bridge | 12N | 3N | 2N + 1 |
| Modified H-bridge (binary progression) | 12N | 3N | $2^{N+1} - 1$ |

TABLE 2

Comparison of Seven-Level Inverter Topologies

| Topology | Primary Devices | DC Buses (Capacitors) | Output Levels |
| --- | --- | --- | --- |
| Diode Clamped | 36 | 6 | 7 |
| Flying Capacitor | 36 | 16 | 7 |
| Conventional H-bridge | 36 | 9 | 7 |
| Modified H-bridge (binary progression) | 24 | 6 | 7 |

Each inverter switching device in a modified H-bridge multilevel inverter 110 in accordance with the present invention may be implemented as an IGBT 134, with a diode 136 connected in anti-parallel with the IGBT 134. As discussed previously, IGBTs 134 may be modulated at high frequencies, e.g., using pulse width modulation techniques, to produce high quality output voltage waveforms with minimal undesirable harmonic content. However, IGBTs cannot be employed at high voltage levels due to the limited voltage blocking capability of IGBTs. For higher voltage levels, GTO thyristor switching devices may be employed. However, GTO thyristors cannot be modulated at high frequencies. In accordance with the present invention, a modified H-bridge multilevel inverter may employ both high frequency modulated switching devices, such as IGBTs, and high voltage blocking switching devices, such as GTO thyristors, at appropriate voltage levels to form a hybrid multilevel power converter which takes advantage of both the high frequency switching capability of the high frequency switching devices and the high voltage blocking capability of the low frequency switching devices to synthesize a high voltage output signal with minimal undesirable spectral content.

An exemplary hybrid modified H-bridge multilevel inverter 150 which employs both high switching frequency and high voltage blocking switching devices to synthesize a high voltage high quality output waveform signal is illustrated in, and will be described with reference to, FIG. 7. The exemplary hybrid modified H-bridge multilevel inverter 150 is a three-phase inverter, having three phase outputs A, B, and C, and a neutral node N. The hybrid modified H-bridge multilevel inverter 150 includes three sets of cascaded, i.e., series connected, H-bridge inverters 152, 154, and 156, which are connected together at the neutral node N. Inverter switching devices in the H-bridge inverters which form the sets of cascaded H-bridge inverters 152, 154, and 156 are controlled to provide three-phase output voltage waveforms at the three phase output nodes A, B, and C, respectively. The three sets of cascaded H-bridge inverters 152, 154, and 156 have identical circuit topologies. Therefore, only one of the sets of cascaded H-bridge inverters 152 will be described in detail herein. (Note that one set of cascaded inverters 152 may be employed by itself to provide a single phase hybrid modified multilevel inverter in accordance with the present invention.)

The set of cascaded H-bridge inverters 152 includes two H-bridge inverters, a low voltage H-bridge inverter 158, and a high voltage H-bridge inverter 160, connected in series. As was illustrated in FIG. 5, the set of cascaded H-bridge inverters 152 may easily be expanded to include more than two H-bridge inverters connected in series. The low voltage H-bridge inverter 158 includes a low voltage DC voltage source 162 and four high frequency switching devices, e.g., IGBTs 164, 166, 168, and 170, connected in an H-bridge configuration across the low voltage DC voltage source 162. (Note that other high frequency switching devices, such as MOSFETs or other transistor based devices, may be employed in place of the IGBTs 164, 166, 168, and 170 in the low voltage H-bridge inverter 158.) Each IGBT switching device 164, 166, 168, and 170 includes a diode 172, 174, 176, or 178 connected in anti-parallel with the IGBT switching device 164, 166, 168, or 170, respectively. Each IGBT switching device 164, 166, 168, and 170 also includes a control line 180, 182, 184, or 186, respectively. The control lines 180, 182, 184, and 186 are connected to a system controller which provides control signals on the control lines 180, 182, 184, and 186 for switching the IGBT switching devices 164, 166, 168, and 170 on and off. The system controller will be described in more detail below. IGBT switching devices 164 and 166 form a first leg of the low voltage H-bridge 158. A connecting node 188 between the IGBT switching devices 164 and 166 in the first leg of the low voltage H-bridge 158 is connected to the neutral node N of the three phase inverter 150. In the exemplary embodiment of a hybrid modified H-bridge multilevel inverter 150 being described, the low voltage DC voltage source 162 for the low voltage H-bridge inverter 158 provides a DC source voltage level of 1.5 kV. The low voltage DC voltage source 162 may, for example, be implemented using any conventional AC to DC converter topology for providing the desired DC source voltage level from an AC voltage source.

The high voltage H-bridge inverter 160 includes a high voltage DC voltage source 190 and four high voltage blocking switching devices, e.g., GTO thyristors 192, 194, 196, and 198, connected in an H-bridge configuration across the high voltage DC voltage source 190. (Note that other high voltage blocking switching devices, such as Integrated Gate Commutated Thyristors (IGCTs) or MOS Turn-Off (MTO) thyristors, may be employed in place of the GTO thyristors 192, 194, 196, and 198 in the high voltage H-bridge inverter 160.) A diode 200, 202, 204, or 206 is connected in anti-parallel with each GTO thyristor switching device 192, 194, 196, and 198, respectively. Each GTO thyristor switching device 192, 194, 196, and 198 also includes a switching device control line 208, 210, 212, or 214, respectively. The control lines 208, 210, 212, and 214 are connected to the system controller which provides GTO switching device control signals on the control lines 208, 210, 212, or 214 for turning the GTO thyristor switching devices 192, 194, 196, or 198 on and off. The system controller will be described in more detail below. A connecting node 216 between GTO thyristor switching devices 192 and 194 in a first leg of the high voltage H-bridge 160 is connected to a connecting point 218 between IGBT switching devices 168 and 170 in a second leg of the low voltage H-bridge 158, thereby connecting the low voltage 158 and high voltage 160 H-bridges together in series. A connecting node 220 between GTO thyristor switching devices 196 and 198 in a second leg of the high voltage H-bridge 160 is the phase output node A of the set of cascaded H-bridge inverters 152. The high voltage DC voltage source 190 preferably provides a high source voltage level which is twice that of the source voltage level provided by the voltage source 162 in the low voltage H-bridge 158. In this exemplary case, the high voltage DC voltage source 190 provides a DC source voltage level of 3 kV. The high voltage DC voltage source 190 may, for example, be implemented in a conventional manner using an AC to DC converter to provide the desired DC source voltage level from an AC voltage supply.

It may be observed that the hybrid modified H-bridge multilevel inverter 150 of FIG. 7 may be controlled to synthesize a stepped waveform signal with voltage levels −4.5 kV, −3 kV, −1.5 kV, 0, 1.5 kV, 3 kV, and 4.5 kV at the phase output node A. High voltage levels +/−3 kV are synthesized by the high voltage H-bridge inverter 160, employing GTO thyristor inverter switching devices 192, 194, 196, and 198. Lower voltage levels +/−1.5 kV are synthesized by the low voltage H-bridge inverter 158, employing IGBT inverter switching devices 164, 166, 168, and 170. The high and low voltage level signals are combined to provide the seven possible phase output voltage levels described.

As discussed previously, the switching capability of the GTO thyristor switching devices 192, 194, 196, and 198 is limited at higher frequencies. Hence, the high voltage level output waveform of the high voltage level H-bridge inverter 160 is limited essentially to a stepped square wave output at the fundamental output frequency, e.g., 60 Hz. However, the IGBT switching devices 164, 166, 168, and 170 in the low voltage H-bridge inverter 158 can be modulated at high frequencies, e.g., 10–20 kHz, using a pulse width modulation technique. The present invention employs a hybrid modulation strategy which incorporates stepped voltage waveform synthesis in the high voltage H-bridge 160 in conjunction with high frequency variable pulse width modulation in the low voltage H-bridge 158. Under this modulation strategy, the GTO thyristor switching devices 192, 194, 196, and 198 in the high voltage H-bridge 160 are modulated to switch only at the fundamental frequency of the phase output voltage waveform of the modified H-bridge multilevel inverter 150. Simultaneously, the IGBT switching devices 164, 166, 168, and 170 in the low voltage H-bridge 158 are modulated at a higher frequency to "fill in" the stepped high voltage waveform. The combination of the high voltage low frequency output of the high voltage H-bridge 160 and the high frequency low voltage output of the low voltage H-bridge 158 is a high voltage high quality output voltage waveform.

The hybrid modulation strategy of the present invention will now be described in more detail with reference to the exemplary modified H-bridge multilevel inverter 150 of FIG. 7. The high 160 and low 158 voltage H-bridge inverters in the set of cascaded H-bridge inverters 152 in the modified H-bridge multilevel inverter 150 may be controlled to synthesize an AC voltage waveform at the phase output node A which varies between −4.5 kV and +4.5 kV. Desired instantaneous output voltage levels at and between these two peak output voltage levels are achieved by modulating the GTO thyristor switching devices 192, 194, 196, and 198 in the high voltage H-bridge 160 at a low frequency, while modulating the IGBT switching devices 164, 166, 168, and 170 at a high frequency, using a pulse width modulation technique, and combining the resulting output signals from the low voltage 158 and high voltage 160 H-bridge inverters to produce the desired AC output voltage signal.

Figure 9:
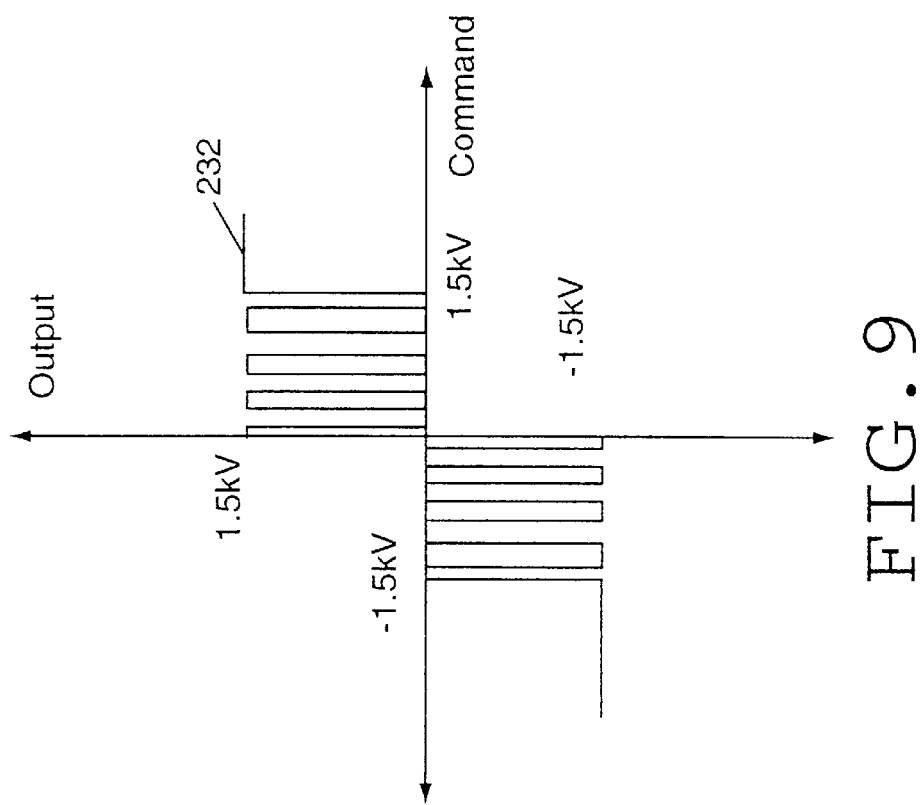
FIG. 9 is a waveform diagram illustrating the static transfer characteristics of the output of a low voltage (IGBT switch based) H-bridge for the exemplary modified H-bridge multilevel inverter of FIG. 7.
Figure 8:
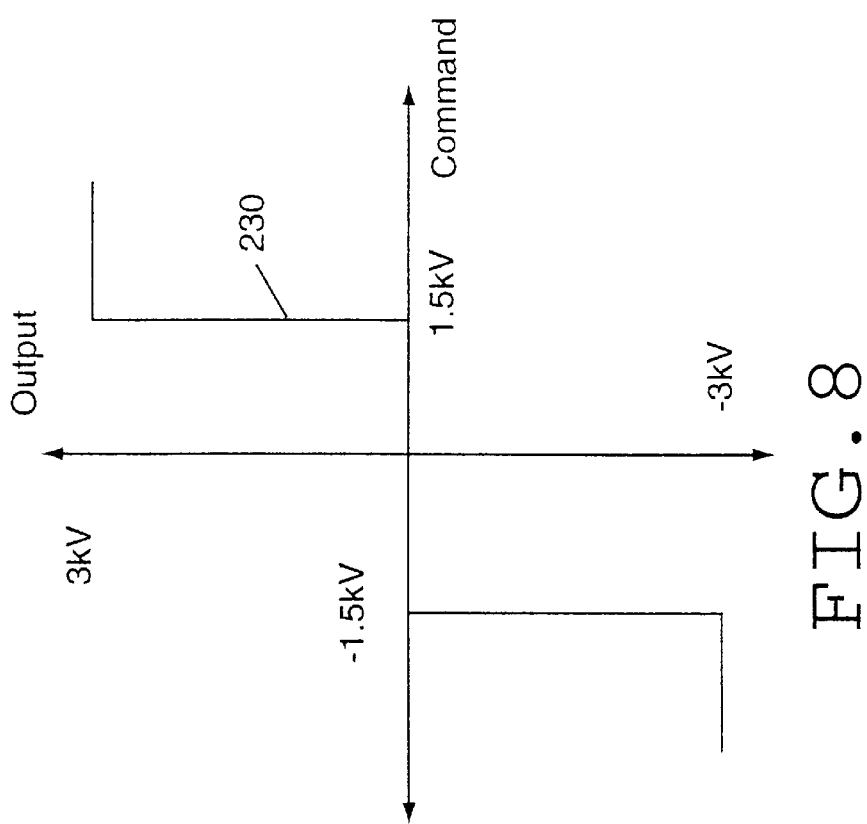
FIG. 8 is a waveform diagram illustrating the static transfer characteristics of the output of a high voltage (GTO switch based) H-bridge for the exemplary modified H-bridge multilevel inverter of FIG. 7.

The static transfer characteristics of the output signal from the high voltage H-bridge inverter 160 are illustrated at 230 in FIG. 8. As may be observed from this figure, the high voltage H-bridge inverter is capable of synthesizing a square wave of amplitude 3 kV. The output of the high voltage H-bridge inverter 160 is controlled to contribute to the modified H-bridge multilevel inverter output when the desired output signal is greater than 1.5 kV or less than −1.5 kV. The static transfer characteristics of the output signal provided by the low voltage H-bridge inverter 158 are illustrated at 232 in FIG. 9. The IGBT switching devices 164, 166, 168, and 170 in the low voltage H-bridge inverter 158 are controlled to provide a high frequency pulse width modulated output of the low voltage H-bridge inverter 158 which varies between either 0 and 1.5 kV or 0 and −1.5 kV, depending upon the instantaneous output voltage to be synthesized.

To synthesize an instantaneous output voltage level between −4.5 kV and −3 kV, the high voltage H-bridge inverter 160 is controlled to provide a −3 kV output and the low voltage H-bridge 158 is controlled to provide a high frequency pulse width modulated output signal which varies between 0 and −1.5 kV. This effectively subtracts between 0 and 1.5 kV from the −3 kV output signal provided by the high voltage H-bridge inverter 160 to produce the desired output voltage signal between −3 kV and −4.5 kV. To synthesize an instantaneous output voltage level between −1.5 kV and −3 kV, the high voltage H-bridge inverter 160 is controlled to provide an output signal of −3 kV and the low voltage H-bridge inverter 158 is controlled to provide a high frequency pulse width modulated signal which varies between 0 and 1.5 kV. This effectively adds a voltage level between 0 and 1.5 kV to the −3 kV output of the high voltage H-bridge inverter 160 to synthesize an instantaneous output voltage level between −1.5 kV and −3 kV. To synthesize an instantaneous output voltage level between 1.5 kV and −1.5 kV, the high voltage H-bridge inverter 160 is controlled to provide 0 volts at its output, and the low voltage H-bridge inverter 158 is controlled to provide a high frequency pulse width modulated output signal which varies between either 0 and −1.5 kV or between 0 and 1.5 kV to synthesize an instantaneous output voltage level between 0 and −1.5 kV or 0 and 1.5 kV, respectively. To synthesize an instantaneous output voltage level between 1.5 and 3.0 kV, the high voltage H-bridge inverter 160 is controlled to provide an output voltage level of 3 kV, and the low voltage H-bridge inverter 158 is controlled to provide a high frequency pulse width modulated output voltage waveform which varies between 0 and −1.5 kV. This effectively subtracts a voltage level of between 0 and 1.5 kV from the 3 kV output of the high voltage H-bridge inverter 160 to synthesize an instantaneous output voltage level between 1.5 and 3 kV. To synthesize an instantaneous output voltage level between 3 kV and 4.5 kV, the high voltage H-bridge inverter 160 is controlled to provide an output voltage signal of 3 kV, and the low voltage H-bridge inverter 158 is controlled to provide a high frequency pulse width modulated output waveform which varies between 0 and 1.5 kV. This effectively adds a voltage level of between 0 and 1.5 kV to the 3 kV output of the high voltage H-bridge inverter 160 to synthesize an instantaneous output voltage level of between 3 kV and 4.5 kV. This modulation strategy is summarized in Table 3, wherein the symbol < >symbolizes high frequency pulse width modulated switching between the two voltage levels indicated.

TABLE 3

Exemplary Modulation Strategy

| Desired Output | GTO Inverter | IGBT Inverter |
|---|---|---|
| Between −4.5 and −3.0 kV | −3 kV | 0 <> −1.5 kV |
| Between −3.0 and −1.5 kV | −3 kV | 0 <> 1.5 kV |
| Between −1.5 and 0 kV | 0 kV | 0 <> −1.5 kV |
| Between 0 and 1.5 kW | 0 kV | 0 <> 1.5 kV |
| Between 1.5 kV and 3.0 kV | 3 kV | 0 <> −1.5 kV |
| Between 3.0 and 4.5 kV | 3 kV | 0 <> 1.5 kV |

A schematic block diagram of a controller 240 for providing control signals to the GTO thyristor switching devices 192, 194, 196, 198, and IGBT switching devices 164, 166, 168, and 170 in the H-bridge inverters 160 and 158 in the cascaded set of H-bridge inverters 152 of the exemplary modified H-bridge multilevel inverter 150 of FIG. 7 is illustrated in, and will be described with reference to, FIG. 10. The controller 240 is an exemplary generic controller structure for a hybrid modified H-bridge multilevel inverter in accordance with the present invention. Based on the generic controller structure described, one skilled in the art will be able to implement a controller for a hybrid modified H-bridge multilevel inverter in accordance with the present invention using analog or digital components, or a combination thereof, or a programmable digital device, such as a microprocessor. (Note that the illustrated controller is for one phase of a multi-phase converter. Controllers for other phases may be implemented in a similar manner.)

A command or reference signal is provided on a line 242 to the system controller 240. The command signal will typically be a sinusoidal signal corresponding in frequency and phase to the desired output waveform of the modified H-bridge multilevel inverter 150. The instantaneous amplitude of the command signal defines the desired instantaneous output voltage of the modified H-bridge multilevel inverter 150. The command signal is compared with a threshold level corresponding to an output voltage level of 1.5 kV at a comparator 244. If the result of the comparison indicates that the desired instantaneous output voltage level is greater than 1.5 kV, a signal is provided from the comparator 244 to switch the output of a two-way switching device 246 to a signal level which corresponds to an instantaneous output voltage level of 3 kV. This is the output voltage level to be provided by the high voltage H-bridge inverter 160 whenever the desired instantaneous output voltage of the modified H-bridge multilevel inverter 150 is greater than 1.5 kV. If the output of the comparator 244 indicates that the desired instantaneous output voltage level is less than 1.5 kV, the signal provided to the two-way switch 246 from the comparator 244 will set the output of the two-way switch 246 to zero. The output of the two-way switch 244 is provided to a high voltage H-bridge inverter output selection circuit 248.

The command signal on line 242 is also provided to a comparator 250 wherein the command signal is compared to a threshold voltage corresponding to a desired instantaneous output voltage level of the modified H-bridge multilevel inverter 150 of −1.5 kV. If the comparison performed by the comparator 250 indicates that the desired instantaneous output voltage level is less than −1.5 kV, a signal is provided to a two-way switch 252 to provide an output signal on the two-way switch 252 having a voltage level corresponding to a desired output voltage level of the high voltage H-bridge inverter 160 of −3 kV. This is the desired voltage level signal provided by the high voltage H-bridge inverter 160 when the desired instantaneous output voltage level of the modified H-bridge multilevel inverter 150 is less than −1.5 kV. If the comparison performed by comparator 250 indicates that the desired instantaneous output voltage level of the modified H-bridge multilevel inverter is greater than −1.5 kV, a signal is provided to the two-way switch 252 to provide an output signal thereon of zero volts. The output of the two-way switch 252 is provided to the high voltage H-bridge inverter output selection circuit 248.

At the high voltage H-bridge output selection circuit 248, the output signals from the two-way switches 246 and 252 are combined. The output of the high voltage H-bridge output selection circuit 248 will be a voltage signal corresponding to the desired output voltage level to be provided by the high voltage H-bridge inverter 160, i.e., +3.0 kV, 0, or −3.0 kV. This signal is provided to a switching signal generator circuit 253 which generates control signals to be provided on control lines 208, 210, 212, and 214 of the GTO thyristor switching devices 192, 194, 196, and 198, respectively, in the high voltage H-bridge inverter 160. The control signals turn on selected ones of the GTO thyristors 192, 194, 196, and 198 to provide the desired output voltage level of the high voltage H-bridge inverter 160 as indicated by the output of the high voltage H-bridge output selection circuit 248. The switching signal generator circuit 253 may be implemented in a conventional manner.

The output of the high voltage H-bridge output selection circuit 248 is also provided to a summing circuit 254. At the summing circuit 254 the command signal on line 242 is subtracted from the signal corresponding to an output voltage of 3.0 kV, 0, or −3.0 kV on the high voltage H-bridge 160 which is provided by the high voltage H-bridge output selection circuit 248. The instantaneous output of the summing circuit 254 is, therefore, a signal corresponding to an output voltage level of between −1.5 kV and +1.5 kV which is to be synthesized by the low voltage H-bridge 158 and combined with the output signal provided by the high voltage H-bridge 160 to generate the desired output waveform for the modified H-bridge multilevel inverter 150. The output signal from the summing circuit 254 is combined with a high frequency carrier signal, such as a triangle carrier signal, at a summing circuit 255. The output of the summing circuit 255 is, therefore, a high frequency pulse width modulated signal corresponding to the desired output of the low voltage H-bridge 158. This signal is provided to two-way switching devices 256 and 258. The switching devices 256 and 258 provide output signals which vary between voltage levels corresponding to output voltage levels to be provided by the low voltage H-bridge of 1.5 kV and 0 V, and voltage levels corresponding to output voltage levels to be provided by the low voltage H-bridge 158 of 0 V and −1.5 V, respectively. The outputs of the two-way switching devices 256 and 258 are provided to another two-way switching device 260. One of the output signals from the two-way switching device 256 or 258 is passed through to the output of the two-way switching device 260. The output of the summing device 254 is provided to a sign detection circuit 262. If the output of the sign detection circuit 262 is positive, the output of two-way switching device 256 is provided on the output of two-way switching device 260. This output signal is a high frequency pulse width modulated signal varying between voltage levels corresponding to voltage levels of 1.5 kV and 0 kV to be provided on the output of the low voltage H-bridge inverter 158. This signal is provided when the command signal indicates the need for an output signal from the low voltage H-bridge inverter 158 which is to be added to the voltage signal provided by the high voltage H-bridge inverter 160. If the output of the sign detector circuit 262 is negative, the output of two-way switching device 258 is presented on the output of two-way switching device 260. This output signal is a high frequency pulse width modulated signal varying between voltage levels corresponding to output voltage levels of 0 and −1.5 kV to be provided by the low voltage H-bridge 158. This signal is provided when the command signal indicates the need for an output voltage signal from the low voltage H-bridge 158 which is to be subtracted from the voltage signal provided by the high voltage H-bridge 160. The output of the two-way switching device 260 represents the desired instantaneous output voltage level of the low voltage H-bridge 158. This signal is provided to a switching signal generator 262 which provides switching signals on control lines 180, 182, 184, and 186 of IGBT switching devices 164, 166, 168, and 170, respectively, to control the IGBT switching devices to generate the desired instantaneous output voltage level of the low voltage H-bridge 158. The switching signal generator 262 may be implemented in a conventional manner to produce the desired switching signals.

Figure 10:
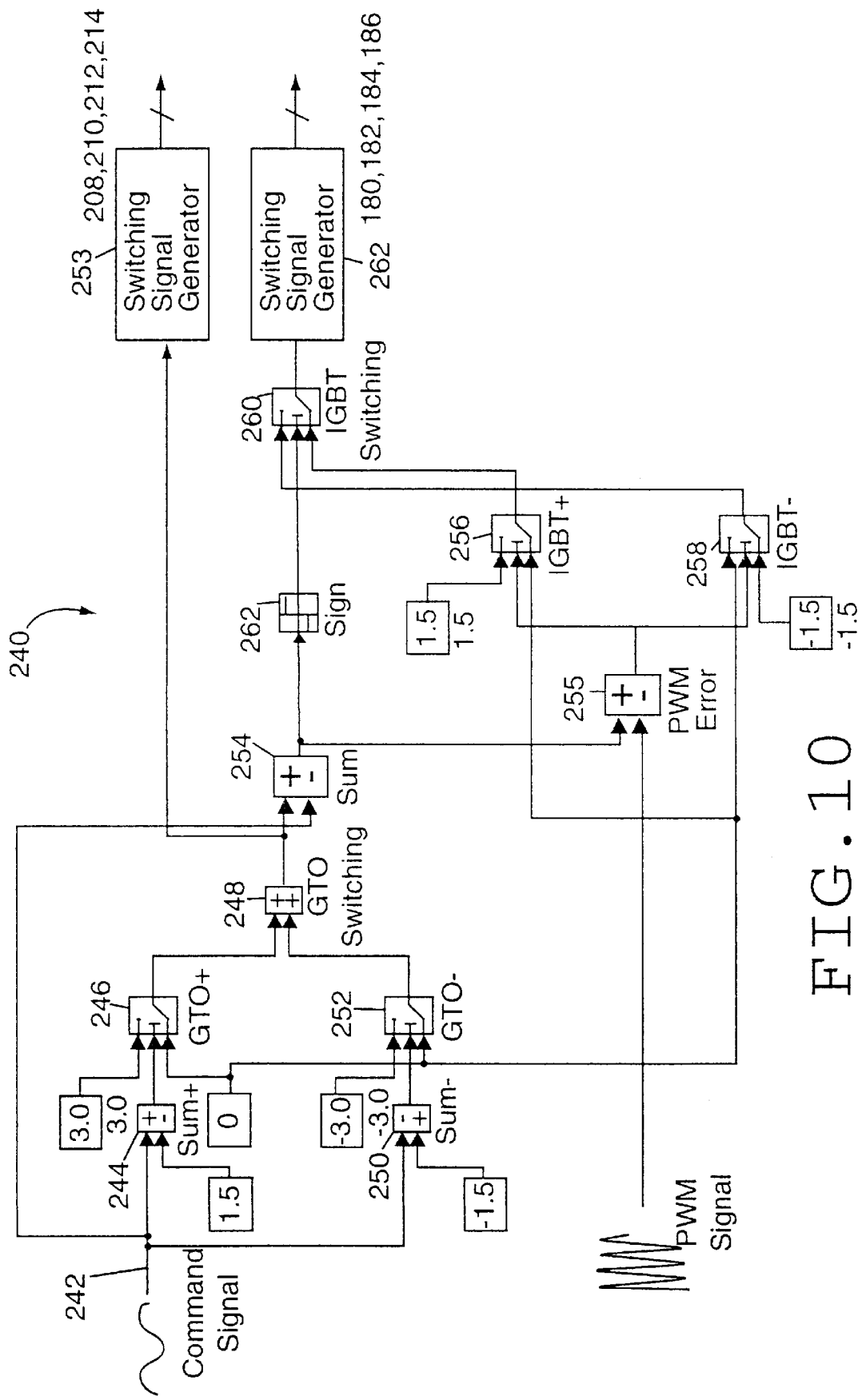
FIG. 10 is a schematic block diagram of a control system for modulating the switching devices of the exemplary modified H-bridge multilevel inverter of FIG. 7.
Figure 11:
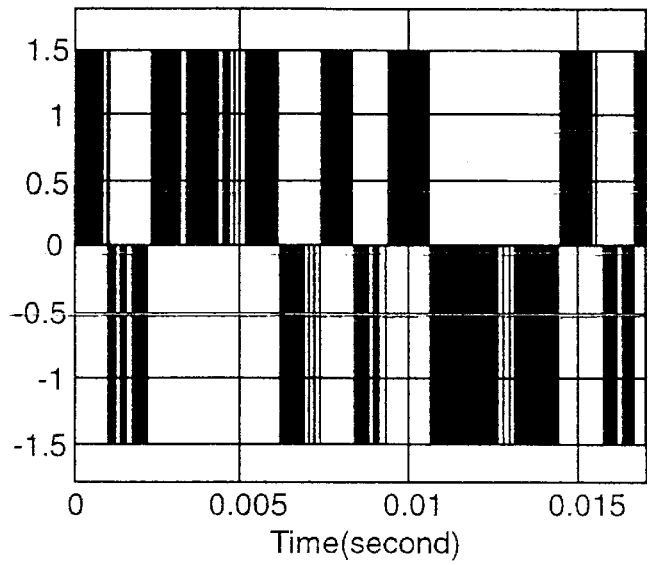
FIG. 11 is a waveform diagram illustrating an exemplary output signal for a low voltage (IGBT switch based) H-bridge in the exemplary modified H-bridge multilevel inverter of FIG. 7.
Figure 12:
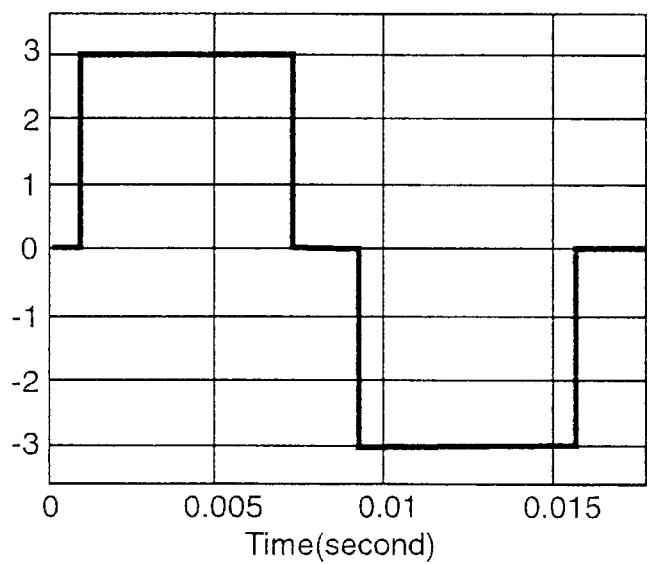
FIG. 12 is a waveform diagram illustrating an exemplary output signal for a high voltage (GTO thyristor switch based) H-bridge in the exemplary modified H-bridge multilevel inverter of FIG. 7.
Figure 13:
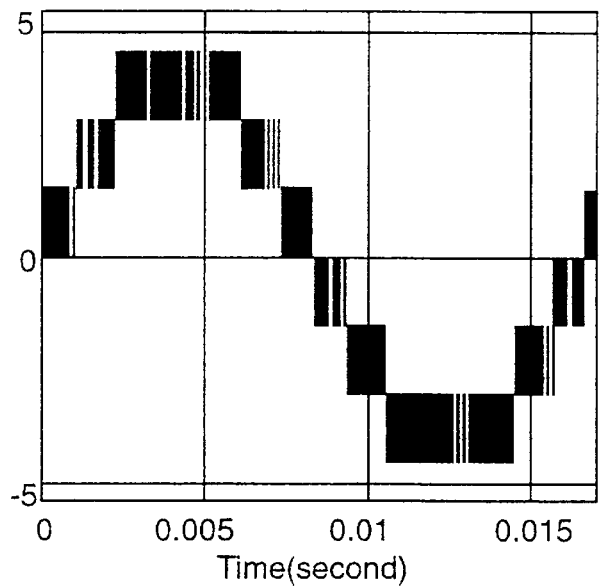
FIG. 13 is a waveform diagram illustrating an AC output waveform synthesized by the exemplary modified H-bridge multilevel inverter of FIG. 7, which is obtained by combining the output signals of FIGS. 11 and 12.

The exemplary modified H-bridge multilevel inverter 150 illustrated in FIG. 7, employing the controller 240 illustrated in FIG. 10, was simulated. The simulation results for a single phase output of the three-phase modified H-bridge multilevel inverter 150 are illustrated in FIGS. 11–13. FIG. 11 illustrates the output from the low voltage H-bridge inverter 158. As illustrated, the output of the low voltage H-bridge inverter 158 is a high frequency pulse width modulated signal which varies between 0 and 1.5 kV or 0 and −1.5 kV. The output of the high voltage H-bridge inverter 160 is illustrated in FIG. 12. As illustrated, the output of the high voltage H-bridge inverter 160 is a stepped square wave signal varying between +3 kV, 0, and −3 kV at the fundamental output frequency of the modified H-bridge multilevel inverter, e.g., 60 Hz. The phase output of the modified H-bridge multilevel inverter 150 is illustrated in FIG. 13. Note that the waveform illustrated in FIG. 13 is the sum of the waveforms illustrated in FIGS. 11 and 12. (Conventional filtering may be applied to derive a high quality sine wave signal from the signal illustrated in FIG. 13.)

It is apparent that the present invention provides a high quality sinusoidal output voltage waveform with reduced harmonic content which can be relatively easily filtered at the output of the inverter. With the hybrid topology and modulation strategy of the present invention, the effective spectral response of the output depends on high frequency switching, while the overall voltage generation level is determine by the number of inverter levels and the voltage ratings of switching devices with high voltage blocking capability. Thus, both a high voltage and high quality AC output voltage waveform signal can be generated by employing a hybrid modified H-bridge multilevel inverter topology in accordance with the present invention.

Figure 5:
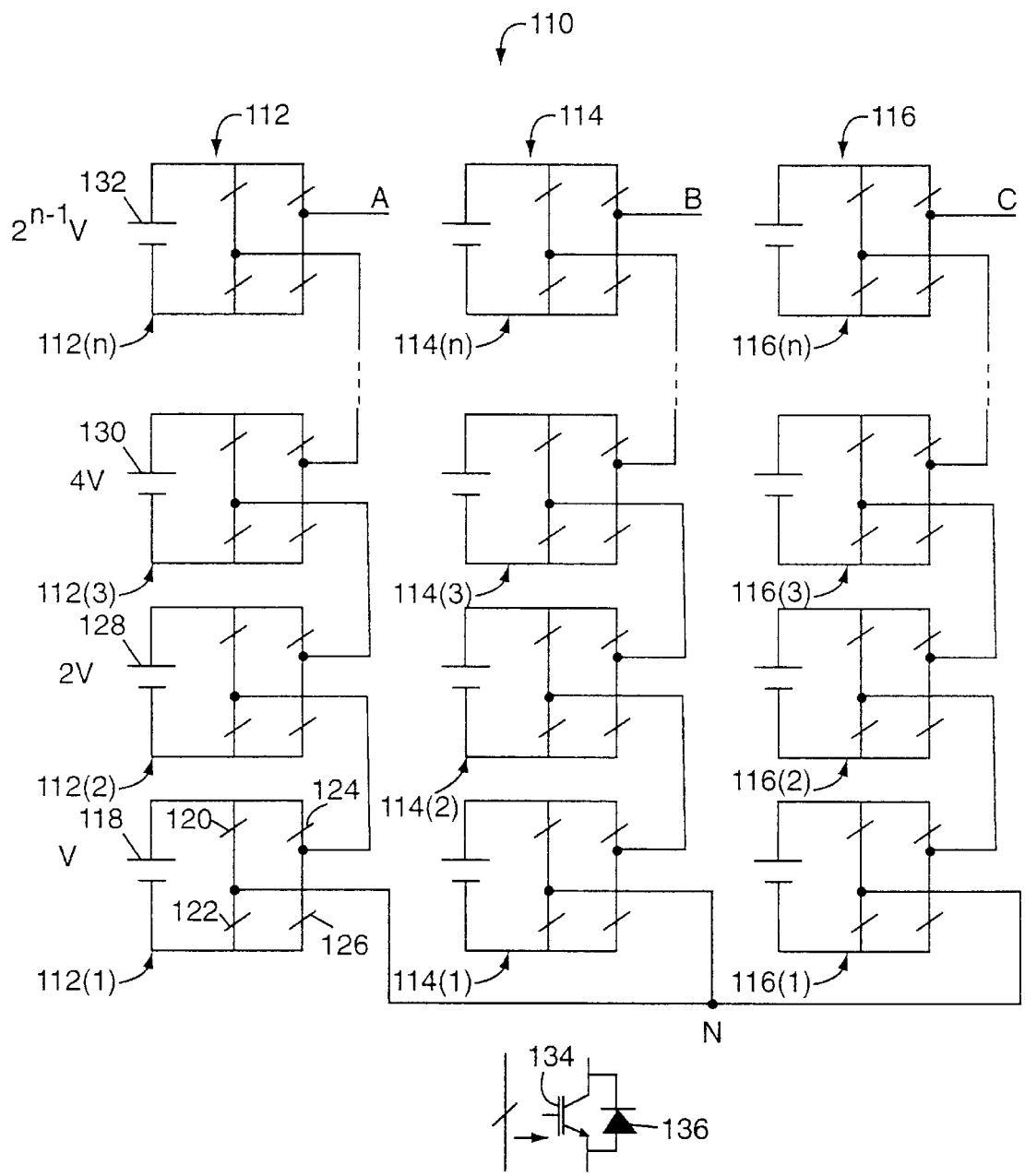
FIG. 5 is a simplified schematic circuit diagram of an exemplary multi-phase $2^{n+1}-1$ level modified H-bridge inverter in accordance with the present invention with n DC source voltage levels arranged in a binary progression.

Considering the modified H-bridge multilevel inverter topology illustrated in FIG. 5, wherein the DC source voltage levels provided by the DC voltage sources in the set of cascaded H-bridge inverters vary in a binary fashion, it may be noted that it is possible to derive an output voltage level of V at the phase output node A by controlling the inverter switching devices in the lowest voltage level H-bridge to provide an output voltage level of -V while simultaneously controlling the switching devices in the second to lowest voltage level H-bridge to provide an output voltage level of 2V. In other words, the output voltage level of V may be derived by subtracting V from 2V. This is a redundant capability of the circuit, since an output voltage level of V is already a basic output level of the inverter.

Figure 14:
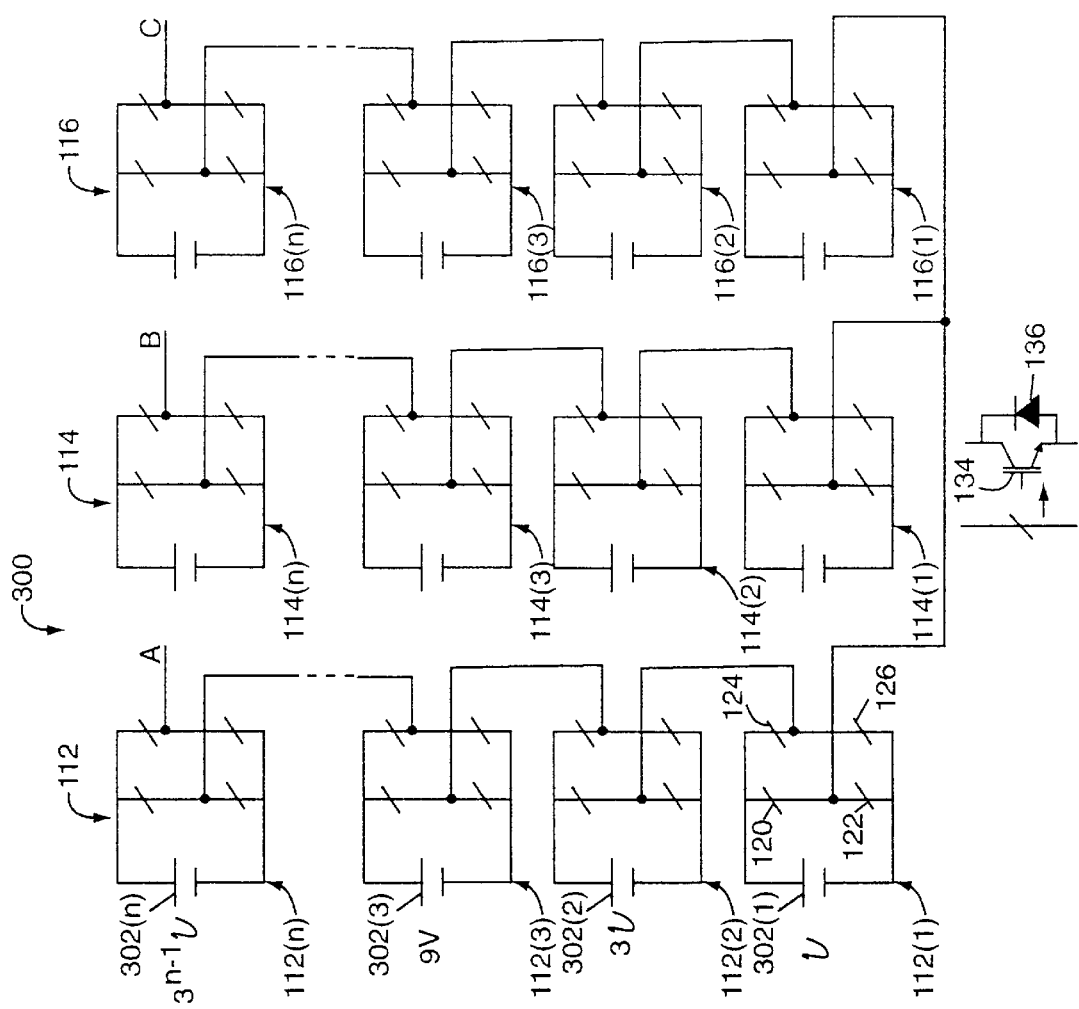
FIG. 14 is a simplified schematic circuit diagram of an exemplary multiphase $3^n$ level modified H-bridge inverter in accordance with the present invention with n DC source voltage levels varying in a geometric progression with a factor of 3.

A simplified schematic circuit diagram of an alternative embodiment of a multi-phase modified H-bridge multilevel inverter in accordance with the present invention 300 is illustrated in, and will be described with reference to, FIG. 14. The basic circuit topology of the multi-phase modified H-bridge multilevel inverter 300 illustrated in FIG. 14 is identical to that of the multi-phase modified H-bridge multilevel inverter 110 illustrated in FIG. 5. (The reference numerals used to identify components of the circuit 110 illustrated in FIG. 5 are employed in FIG. 14 to refer to corresponding components of the circuit 300 illustrated therein.) The multi-phase modified H-bridge multilevel inverter 300 illustrated in FIG. 14 may be operated and controlled in essentially the same manner as the multi-phase modified H-bridge multilevel inverter 110 illustrated in FIG. 5. The only significant difference between the multi-phase modified H-bridge multilevel inverter 300 and the modified H-bridge multilevel inverter 110 is that the DC voltage sources 302 (1-n) in the cascaded H-bridge inverters employed in the modified H-bridge multilevel inverter 300 vary in a geometric progression with a factor of three, rather than in a binary progression, as in the modified H-bridge multilevel inverter 110. The arrangement of DC source voltage levels of the modified H-bridge multilevel inverter 300, in a geometric progression with a ratio of three, may be termed an order-3 configuration or arrangement.

Figure 15:
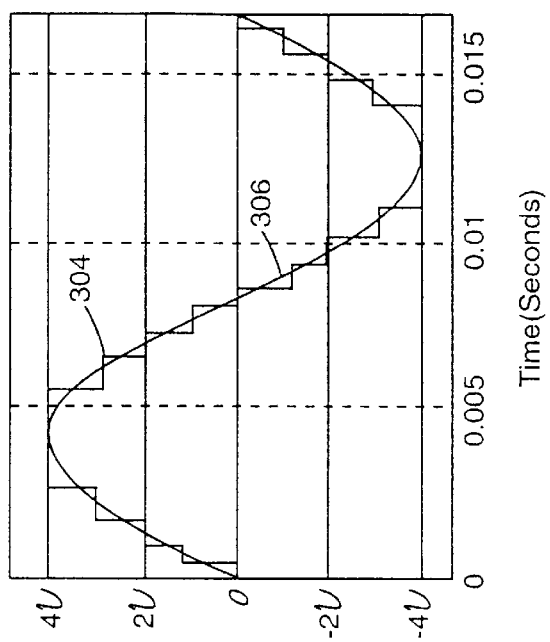
FIG. 15 is a waveform diagram illustrating an exemplary single phase output voltage waveform for the multilevel inverter of FIG. 14.

The number of distinct output voltage levels that can be achieved with an order-3 configuration employing n inverter levels is $3^n$. For example, for a two inverter level order-3 configuration modified H-bridge inverter in accordance with the present invention, employing DC voltage sources providing DC source voltage levels of 1V and 3V, nine distinct output voltage levels (0, +/− V, +/−2V, +/−3V, and +/−4V) may be derived at the multilevel inverter output. An exemplary output voltage waveform 304 for such a nine-level order-3 configuration multilevel inverter in accordance with the present invention is illustrated in FIG. 15. (Waveform 306 illustrates the desired sinusoidal output voltage waveform of the inverter.) Output voltage levels +/−2V and +/−4V can be derived from the basic inverter source voltage levels of +/− V and +/−3V. Unlike the binary (order-2) configured DC source voltage topology described earlier, there is no redundancy in the derived levels. It may be noted that this concept cannot be extended any further without adversely affecting the spectral performance of a multilevel inverter in accordance with the present invention. For example, a modified H-bridge multilevel inverter having two inverter levels with DC voltage sources providing DC source voltage levels of V and 4V is not preferred, because the ability to synthesize an intermediate level, i.e., +/−2V, in this case, is lost. The inability to provide adjacent level output switching penalizes spectral performance. Moreover, there is no additional advantage in the number of synthesized levels which may be achieved by varying the DC voltage levels provided by DC voltage sources in a multilevel inverter in accordance with the present invention in a geometric progression with a factor of more than three.

A basic H-bridge inverter level is capable of synthesizing three distinct voltage levels at the output thereof. Hence, the maximum number of output levels that can be achieved in a topology with n such inverter levels is $3^n$. It is possible to achieve $3^n$ output levels using n inverter levels only with an order-3 configuration. Hence, the order-3 configuration achieves the maximum number of output voltage levels in an H-bridge multilevel inverter topology in accordance with the present invention, for a given number of DC voltage sources. Moreover, such a topology has the capability of generating all intermediate voltage levels, thereby maintaining a uniformly predictive spectral structure at the output. When compared to a conventional multilevel H-bridge inverter topology, having equal DC source voltage levels, an order-3 arrangement is capable of generating a substantially higher number of output voltage levels. For example, a conventional multilevel inverter with three equal DC voltage sources can synthesize only seven distinct voltage levels at the multilevel inverter output. With a three inverter level inverter having an order-3 arrangement, i.e., having inverter DC source voltage levels of V, 3V, and 9V, twenty-seven distinct output voltage levels can be obtained, which results in a substantial improvement in spectral performance. However, it should be noted that the basic DC source voltage levels of an order-3 configuration vary in the ratio 1:3:9. This implies that the voltage ratings of the three inverters employed in a set of three series connected inverters in an order-3 inverter topology are 0.07 per unit, 0.23 per unit, and 0.70 per unit, respectively. In some situations, it may not be feasible to distribute a high voltage across three DC busses with such disparity. This may be a limitation on extending the order-3 configuration beyond two or three DC sources per phase. However, it is possible to use intermediate configurations, such as DC source voltage ratios of 1:3:4, 1:3:5, etc., which still produce, in this case, 16 and 18 output voltage levels, respectively, while restricting the voltage disparity between DC source voltage levels.

As discussed previously, the spectral quality of the basic stepped or staircase output waveform which may be provided by a multilevel inverter in accordance with the present invention may be enhanced by employing pulse width modulation (PWM) techniques. It is possible to use conventional modulation strategies, such as sub-harmonic modulation and space vector modulation, with the inverter topologies described herein to obtain further improvement in the synthesized output waveform. However, this approach is not preferred for the multilevel configurations with unequal DC source voltage levels described herein. As described previously, a modulation strategy which incorporates stepped synthesis at high voltage levels with variable pulse width modulation at lower voltage levels is preferred. This control philosophy combines a faster switching low voltage inverter with a slower switching high voltage inverter. Under this hybrid modulation strategy, the effective spectral structure of the multilevel inverter output voltage waveform depends on the high frequency switching of the low voltage inverter, while the overall voltage capability is determined by the voltage ratings of the switching devices employed in the high voltage inverter connected thereto.

Figure 16:
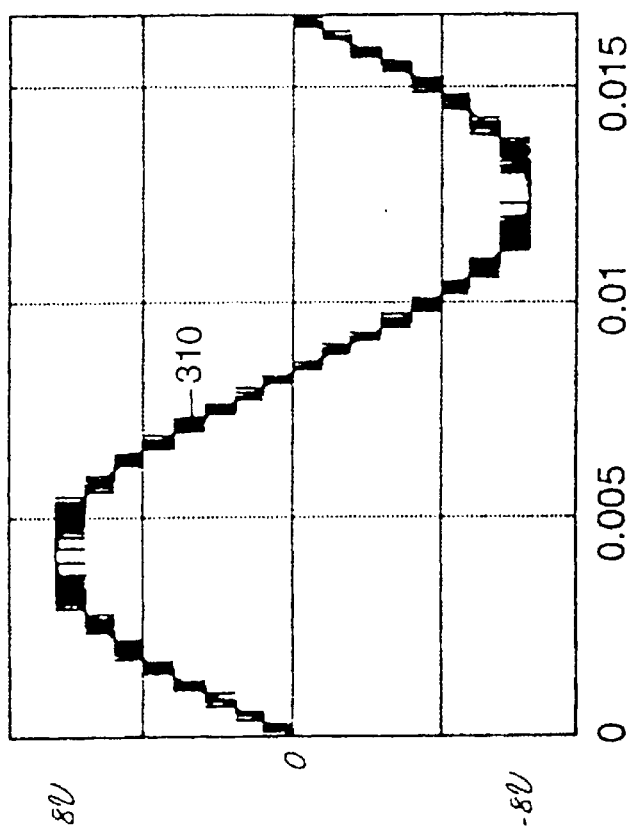
FIG. 16 is a waveform diagram illustrating an exemplary output voltage waveform for a multilevel inverter in accordance with the present invention having three DC source voltage levels of V, 2V, and 5V, and wherein the source voltage level V is pulse width modulated.

The hybrid modulation strategy described previously can be extended for a general multilevel inverter configuration with unequal DC source voltage levels in accordance with the present invention. In general, the inverter level with the smallest DC source voltage level V may be switched at a high frequency, and its output combined with a baseline staircase waveform provided by the higher voltage inverters in the multilevel inverter to enhance the overall spectral quality of the multilevel inverter output. For example, with a multilevel inverter topology in accordance with the present invention having inverter DC source voltage levels of V, 2V, and 5V, output voltage levels of +/−3V and +/−7V may be derived from the basic inverter source voltage levels +/−2V and +/−5V. By high frequency switching of the lowest voltage inverter in the multilevel inverter, an output voltage varying between 0 and V and 0 and −V is obtained. This high frequency pattern is superimposed on the basic (+/−3V and +/−7V) and derived (+/−2V and +/−5V) voltage levels to obtain a complete PWM waveform between all possible voltage levels from −8V to +8V. An exemplary output voltage waveform 310 for such an inverter configuration employing this modulation strategy is illustrated in FIG. 16.

In order to provide a complete PWM capability, the levels in the multilevel inverter, other than the lowest level inverter, having a DC source voltage level of V, should be able to synthesize every alternate step on a staircase waveform. This implies that the inverters in the multilevel inverter should be capable of generating all the even multiples of the same voltage level of the lowest voltage inverter in the multilevel inverter, i.e., 2V, 4V, 6V, etc. If this condition is satisfied, PWM pattern switching of the lowest voltage inverter, between +V, 0, and −V, may be combined with the higher inverter output voltage levels to obtain a complete PWM waveform. The requirement of synthesizing 2V, 4V, 6V, etc., can be translated to generating the equivalent of twice the conventional pattern of adjacent source voltage level steps, i.e., 2V=2×V, 4V=2×2V, 6V=2×3V, and so on. The configuration which can generate all of the consecutive steps with the least number of DC voltage sources, for a complete PWM capability, would have DC source voltage levels of V, 2×(V), 2×(3V), 2×(9V), etc. Note that the numbers in parenthesis form an order three configuration. The configuration which can generate the maximum number of all the consecutive steps with an intermediate variation in their pulse widths, for a given number of DC voltage sources is: V, 2V, 6V, . . . $2*3^{n-2}$V. All normalized configurations of DC voltage sources, arranged in an ascending order, are completely PWM capable if each individual voltage source is smaller than or equal to the corresponding voltage in this sequence. Order-1 multilevel inverters, having equal DC source voltage levels, and order-2 multilevel inverter configurations, having DC source voltage levels varying in a binary fashion, are completely PWM capable by this rule. In contrast, the order-3 configuration is not completely PWM capable.

A comparative evaluation summarizing these features is presented in Table 4. Entries in this table are all possible multilevel inverter configurations which satisfy the adjacent step synthesis rule. This means that all of the configurations in this table can generate all the intermediate consecutive steps in a multilevel waveform. Only the configurations presented in the table are qualified to do so. As may be observed, the number of synthesized levels increases as one approaches order-3 configuration. However, this increase in synthesized output voltage levels is accompanied by a corresponding increase in disparity among the DC source voltage levels. Conventional configurations with equal DC source voltage levels have no disparity (=1). The maximum disparity (=3) is attributable to order-3 configurations. Also, no configuration with DC source voltage levels greater than 2V, but without a DC source voltage level of 2V, is capable of achieving full PWM capability. Waveform 312 (FIG. 17) illustrates the output of an exemplary multilevel inverter in accordance with the present invention having inverter DC source voltage levels of V, 2V, and 6V. Waveform 314 (FIG. 18) illustrates the output of an exemplary multilevel inverter in accordance with the present invention having inverter DC source voltage levels of V, 3V, and 6V. In both cases, the output of the inverter having a source voltage level of V is pulse width modulated. Note that both such configurations have equal amounts of disparity (2.5), and they are capable of generating almost the same number of output voltage levels (19 and 21, respectively). However, whereas the multilevel inverter having inverter source voltage levels of V, 2V, and 6V is completely PWM capable, the multilevel inverter having inverter source voltage levels of V, 3V, and 6V is not.

TABLE 4

Comparison of Different Configurations of H-Bridge Multilevel Inverters

| No. of dc voltage sources per phase (n) | Configuration $V_1 V_2 \ldots V_i \ldots V_n$ | Total no. of levels $2\Sigma V_i + 1$ | Measure of disparity $\frac{1}{n-1}\Sigma\frac{V_i}{V_{i-1}}$ | PWM capability |
|---|---|---|---|---|
| 1 | 1V | 3 | 1.00 | FULL |
| 2 | 1V  1V | 5 | 1.00 | FULL |
|   | 1V  2V | 7 | 2.00 | FULL |
|   | 1V  3V | 9 | 3.00 | PARTIAL |
| 3 | 1V  1V  1V | 7 | 1.00 | FULL |
|   | 1V  1V  2V | 9 | 1.50 | FULL |
|   | 1V  1V  3V | 11 | 2.00 | FULL |
|   | 1V  1V  4V | 13 | 2.50 | FULL |
|   | 1V  1V  5V | 15 | 3.00 | PARTIAL |
|   | 1V  2V  2V | 11 | 1.50 | FULL |
|   | 1V  2V  3V | 13 | 1.75 | FULL |
|   | 1V  2V  4V | 15 | 2.00 | FULL |
|   | 1V  2V  5V | 17 | 2.25 | FULL |
|   | 1V  2V  6V | 19 | 2.50 | FULL |
|   | 1V  2V  7V | 21 | 2.75 | PARTIAL |
|   | 1V  3V  3V | 15 | 2.00 | PARTIAL |
|   | 1V  3V  4V | 17 | 2.17 | PARTIAL |
|   | 1V  3V  5V | 19 | 2.34 | PARTIAL |
|   | 1V  3V  6V | 21 | 2.50 | PARTIAL |
|   | 1V  3V  7V | 23 | 2.67 | PARTIAL |
|   | 1V  3V  8V | 25 | 2.84 | PARTIAL |
|   | 1V  3V  9V | 27 | 3.00 | PARTIAL |
| 4 | V  V  V  V | 9 | 1.00 | FULL |
|   | "  "  "  " | " | " | " |

A schematic block diagram of a controller 340 for providing control signals to the switching devices in the H-bridge inverters of a cascaded set of three H-bridge inverters of a modified H-bridge multilevel inverter in accordance with the present invention, to control the multilevel inverter to provide a full PWM output voltage signal in the manner described previously is illustrated in, and will be described with reference to, FIGS. 19–22. The controller 340 provides switching device control signals to the multilevel inverter to control the switching devices of the inverter having the lowest DC source voltage level to provide a high frequency pulse width modulated output, and to control the inverter switching devices of the other two, medium and highest level, inverters to provide a stepped waveform to which the pulse width modulated output waveform of the lowest level inverter is added to provide a complete pulse width modulated output signal of the multilevel inverter. The exemplary controller 340 will be described with reference to the application thereof to a multilevel inverter having a lowest DC source voltage level of V, a medium DC source voltage level of 2V, and a highest DC source voltage level of 6V, and capable of providing a full PWM output voltage signal between −9V and 9V. However, the controller 340 is an exemplary generic controller structure for a hybrid modified H-bridge multilevel inverter in accordance with the present invention, and may be applied to similar multilevel H-bridge inverter topologies having different DC source voltage levels than those described. It will be noted that the controller 340 is similar to, and an extension of, the controller 240 described previously with reference to FIG. 10. Furthermore, it will be apparent that the topology of the controllers 240 and 340 illustrated in FIGS. 10 and 19–22, and described herein, is highly modular, and may easily be extended for application to multilevel inverters in accordance with the present invention having more than three inverter levels. Based on the generic controller structure described, one skilled in the art will be able to implement a controller for a hybrid modified multilevel inverter in accordance with the present invention using analog or digital components, or a combination thereof, or a programmable digital device, such as a microprocessor. (Note that the illustrated controller 340 is for one phase of a multi-phase converter. Controllers for other phases may be implemented in a similar manner.)

A command or reference signal is provided on a line 342 to the system controller 340. The command signal will typically be a sinusoidal signal corresponding in frequency and phase to the desired output waveform of the multilevel inverter. The instantaneous amplitude of the command signal defies the desired instantaneous output voltage of the multilevel inverter.

The command signal is provided directly to a modulator 343 for the switching devices in the highest level inverter of the multilevel inverter. (See FIG. 20.) In the highest level modulator 343, the command signal is compared with a threshold level corresponding to an output voltage level equal to the sum of all smaller DC source voltage levels in the other inverters in the multilevel inverter. In this case, the command signal is compared with a threshold level corresponding to an output voltage level of 3V at comparator 344. If the result of the comparison indicates that the desired instantaneous output voltage level is greater than 3V, a signal is provided from the comparator 344 to switch the output of a two-way switching device 346 to a signal level which corresponds to an instantaneous output voltage level of, in this case, 6V. This is the output voltage level to be provided by the highest voltage level inverter whenever the desired instantaneous output voltage of the multilevel inverter is greater than 3V. If the output of the comparator 344 indicates that the desired instantaneous output voltage level is less than 3V, the signal provided to the two-way switch 346 from the comparator 344 will set the output of the two-way switch to zero. The output of the two-way switch 346 is provided to a highest voltage inverter output selection circuit 348.

The command signal on line 342 is also provided to a comparator 350 wherein the command signal is compared to a threshold corresponding to a desired instantaneous output voltage level of the multilevel inverter of the negative sum of all of the smaller DC source voltage levels in the other inverters in the multilevel inverter. If the comparison performed by the comparator 350 indicates that the desired instantaneous output voltage level is less than, in this case, −3V, a signal is provided to a two-way switch 352 to provide an output signal on the two-way switch 352 having a voltage level corresponding to a desired output voltage level of the highest voltage level inverter of, in this case, −6V. This is the desired voltage level signal to be provided by the highest voltage level inverter when the desired instantaneous output voltage level of the multilevel inverter is less than −3V. If the comparison performed by comparator 350 indicates that the desired instantaneous output voltage level of the multilevel inverter is greater than −3V, a signal is provided to the bi-directional switch 352 to provide an output signal thereon of zero volts. The output of the two-way switch 352 is provided to the highest voltage inverter output selection circuit 348.

Figure 19:
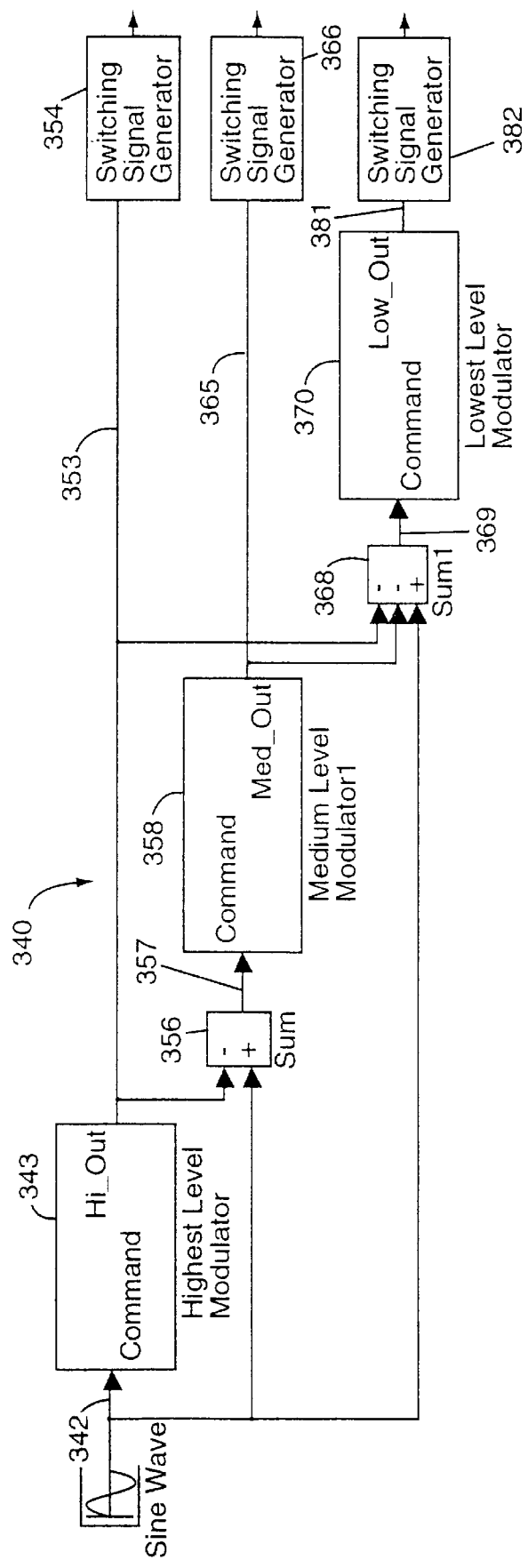
FIG. 19 is a schematic block diagram of a control system for modulating the switching devices of a modified H-bridge multilevel inverter in accordance with the present invention having three DC source voltage levels of V, 2V, and 6V, wherein the source voltage level V is pulse width modulated.
Figure 20:
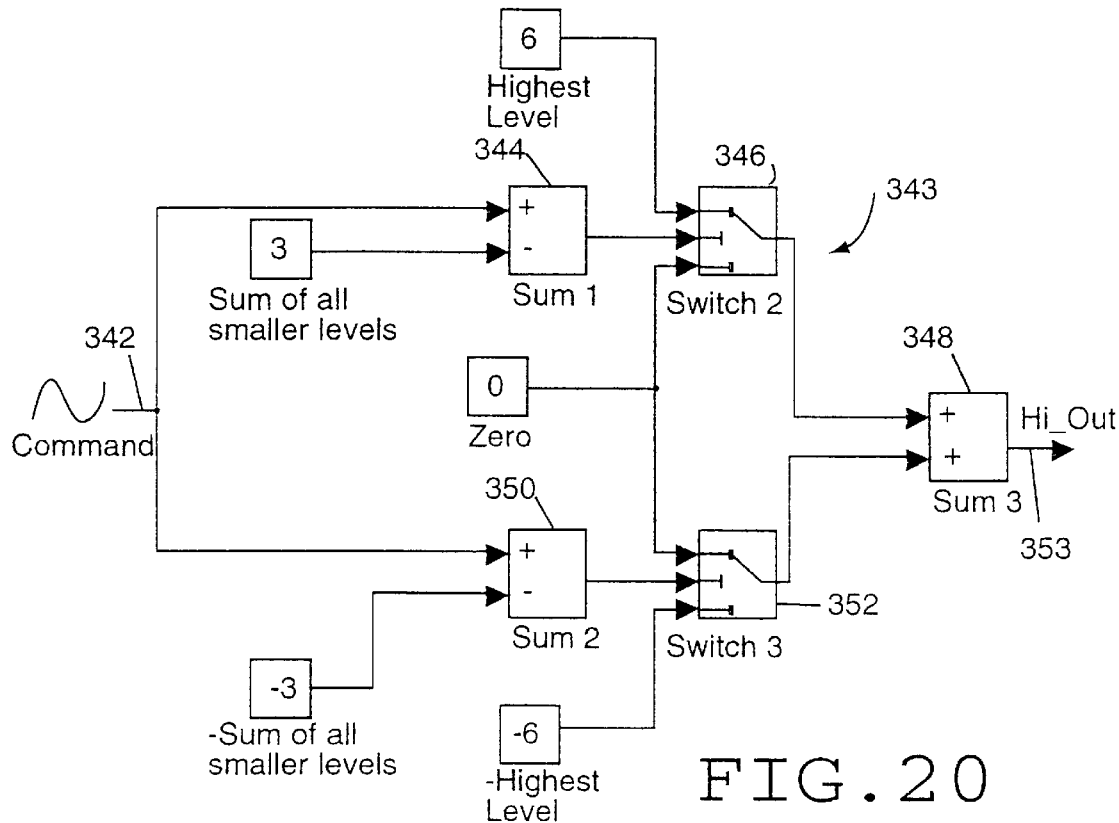
FIG. 20 is a schematic block diagram of a highest voltage level modulator portion of the control system of FIG. 19.

At the highest voltage inverter output selection circuit 348, the output signals from the two-way switches 346 and 352 are combined. The output of the highest voltage inverter output selection circuit 248 will be a voltage signal corresponding to the desired output voltage level from the highest voltage inverter of, in this case, +6V, 0, or −6V. This signal is provided on a line 353 to a highest level inverter switching signal generator circuit 354, which generates control signals to be provided on control lines to the switching devices in the highest voltage level inverter (FIG. 19). The control signals turn on selected ones of the inverter switching devices in the highest level inverter to generate the output voltage level indicated by the output of the highest voltage level inverter output selection circuit 348. The switching signal generator circuit 354 may be implemented in a conventional manner.

The output of the highest voltage level inverter output selection circuit 348 is also provided to a summing circuit 356. At the summing circuit 356, the command signal on line 342 is subtracted from the signal corresponding to the output voltage of, in this case, 6V, 0, or −6V, from the highest voltage level inverter. The instantaneous output of the summing circuit 356 is, therefore, a command signal corresponding to a voltage level of between +3V and −3V.

Figure 21:
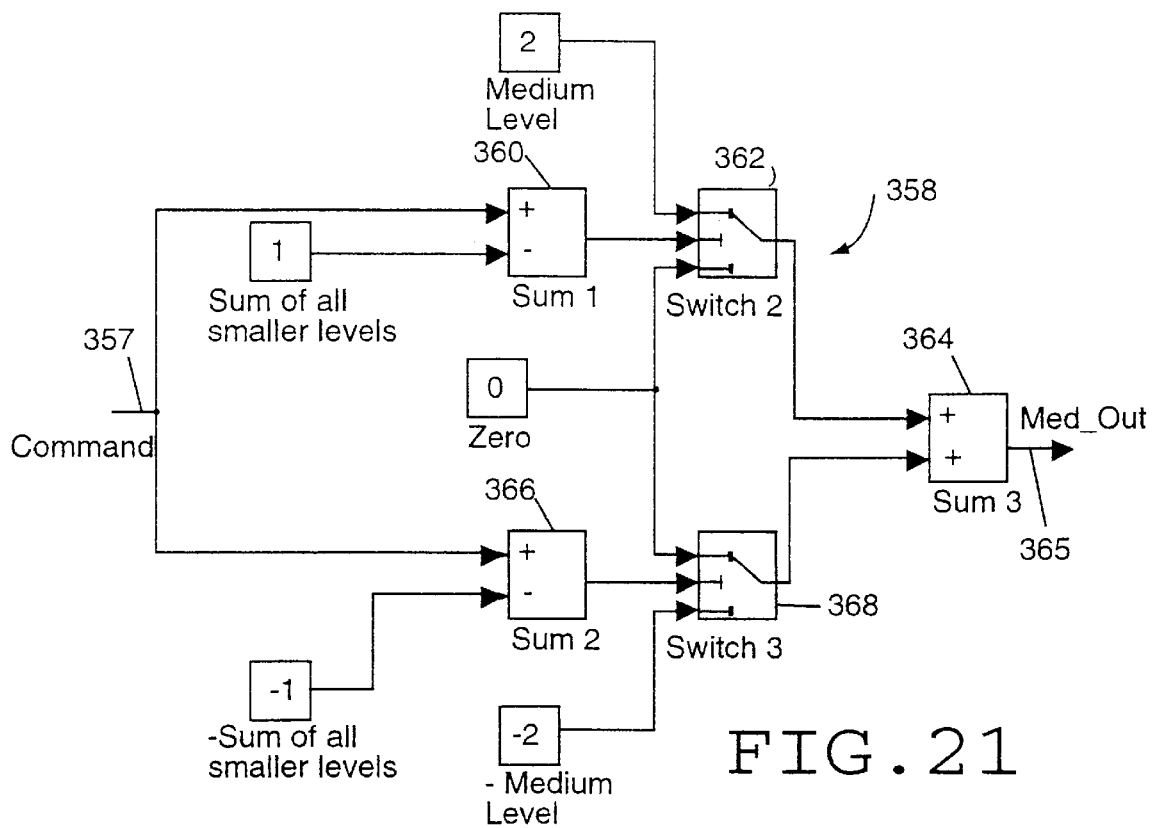
FIG. 21 is a schematic block diagram of a medium voltage level modulator portion of the control system of FIG. 19.

The output signal from the summing circuit 356 is provided as a command signal on line 357 to the medium level modulator circuit 358. (FIG. 21.) The command signal from the summing circuit 356 is provided on the line 357 to a comparator 360 in the medium level modulator 358 wherein the command signal is compared to a threshold voltage corresponding to the sum of the DC source voltage levels of all of the other inverters in the multilevel inverter. In this case, the command signal is compared with a threshold level corresponding to an output voltage level of V at comparator 360. If the result of the comparison indicates that the command signal is greater than V, a signal is provided from the comparator 360 to switch the output of a two-way switching device 362 to a signal level which corresponds to an instantaneous output voltage level of 2V. If the output of the comparator 360 indicates that the command signal value is less than V, the signal provided to the two-way switch 362 from the comparator 360 sets the output of the two-way switch 362 to zero. The output of the two-way switch 362 is provided to a medium level inverter output selection circuit 364.

The command signal on line 357 is also provided to a comparator 366 wherein the command signal is compared to a threshold voltage corresponding to the negative sum of the DC source voltage levels of all smaller voltage level inverters in the multilevel inverter. In this case, the command signal on line 357 is compared to a threshold voltage of −V. If the comparison performed by the comparator 366 indicates that the command signal on line 357 is less than a threshold voltage corresponding to the inverter output voltage level −V, a signal is provided to a two-way switch 368 to provide an output signal on the two-way switch 368 having a voltage level corresponding to a desired output voltage of the medium level modulator of, in this case, −2V. If the comparison performed by the comparator 366 indicates that the command signal provided on line 357 corresponds to an inverter output voltage level of greater than −V, a signal is provided on the bidirectional switch 368 to provide an output signal thereon of zero volts. The output of the two-way switch 368 is provided to the medium voltage level inverter output selection circuit 364.

At the medium voltage level inverter output selection circuit 364, the output signals from the two-way switches 362 and 368 are combined. The output of the medium voltage level inverter output selection circuit 364 will be a voltage signal corresponding to the desired output voltage level from the medium voltage inverter of, in this case, +2V, 0, or −2V. This signal is provided on a line 365 to a switching signal generator circuit 366 (FIG. 19) which generates control signals to be provided on control lines to switching devices in the medium level inverter. The control signals turn on selected ones of the switching devices in the medium level inverter to provide the desired output voltage level of the medium voltage level inverter as indicated by the output of the medium voltage level inverter output selection circuit 364. The switching signal generator circuit 366 may be implemented in a conventional manner.

The output of the highest voltage level inverter output selection circuit 348 and the output of the medium voltage level inverter output selection circuit 364 are provided to a summing circuit 368. At the summing circuit 368, the signal corresponding to an output voltage of 6V, 0, or −6V, from the highest voltage level inverter modulator circuit 343, and the signal corresponding to an output voltage level of 2V, 0, or −2V, from the medium voltage level inverter modulator circuit 358, are subtracted from the command signal on line 242. The instantaneous output of the summing circuit 368 is, therefore, a signal corresponding to a voltage level of between V and −V which is to be synthesized by the lowest voltage level inverter and combined with the output signals provided by the highest voltage level inverter and the medium voltage level inverter to generate the desired output waveform for the multilevel inverter.

Figure 22:
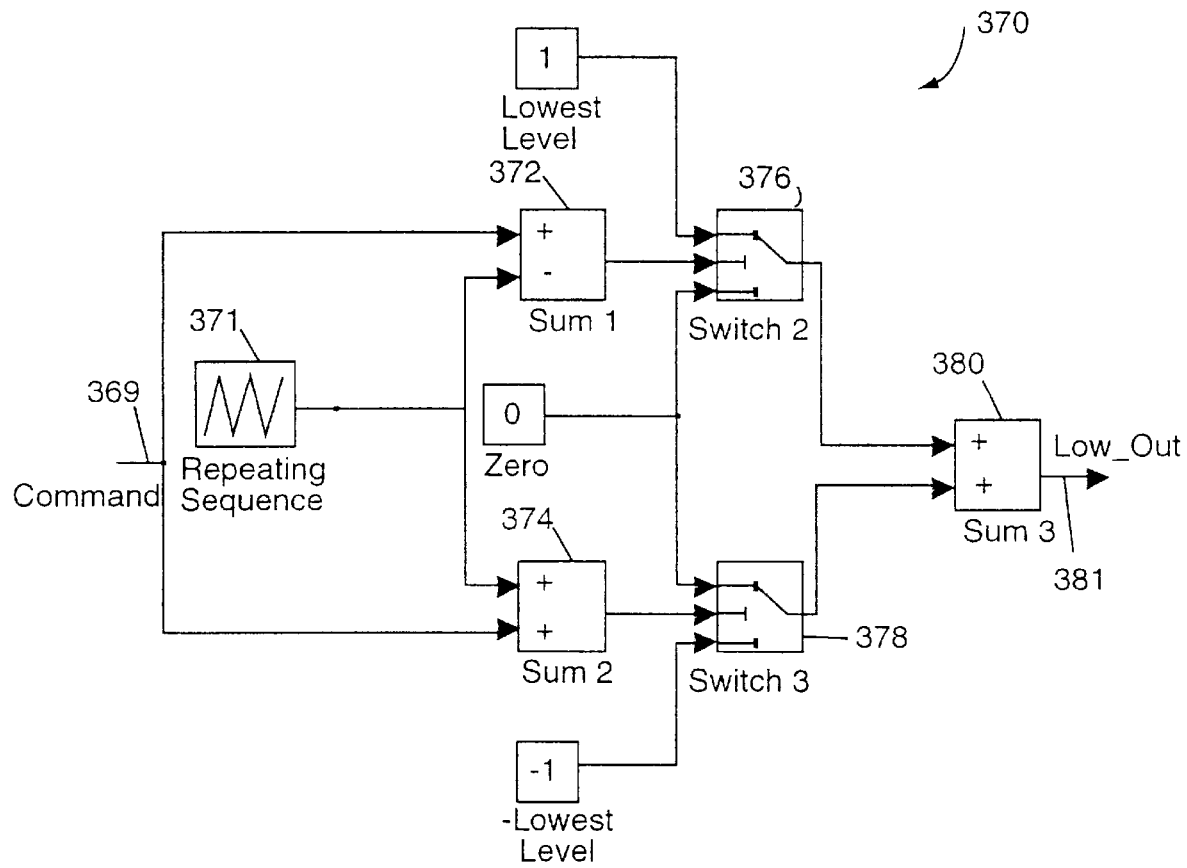
FIG. 22 is a schematic block diagram of a lowest voltage level modulator portion of the control system of FIG. 19.

The output signal from the summing circuit 368 is a command signal which is provided to the lowest voltage inverter modulator circuit 370 on the line 369. (FIG. 22.) The command signal provided on line 369 is combined with a high frequency carrier signal, such as a triangle carrier signal 371, at summing circuits 372 and 374. The outputs of the summing circuits 372 and 374 are, therefore, high frequency pulse width modulated signals corresponding to the desired output of the lowest voltage level inverter. The signals provided by the summing circuits 372 and 374 are provided to two-way switching devices 376 and 378, respectively. The two-way switching devices 376 and 378 provide output signals which vary between a voltage level corresponding to a output voltage level from the lowest voltage level inverter of 1V and 0V, and 0V and −1V, respectively. The outputs of the switching devices 376 and 378 are combined at a summing circuit 380. The output of the summing circuit 380 is a pulse width modulated signal representing the desired instantaneous output voltage level of the lowest voltage level inverter in the multilevel inverter. This signal is provided on a line 381 to a switching signal generator 382 which provides switching signals on control lines to the switching devices in the lowest voltage level inverter in the multilevel inverter, to control the switching devices in the lowest level inverter to generate the desired instantaneous output voltage level of the lowest voltage level inverter. The switching signal generator 382 may be implemented in a conventional manner to produce the desired switching signals.

Figure 17:
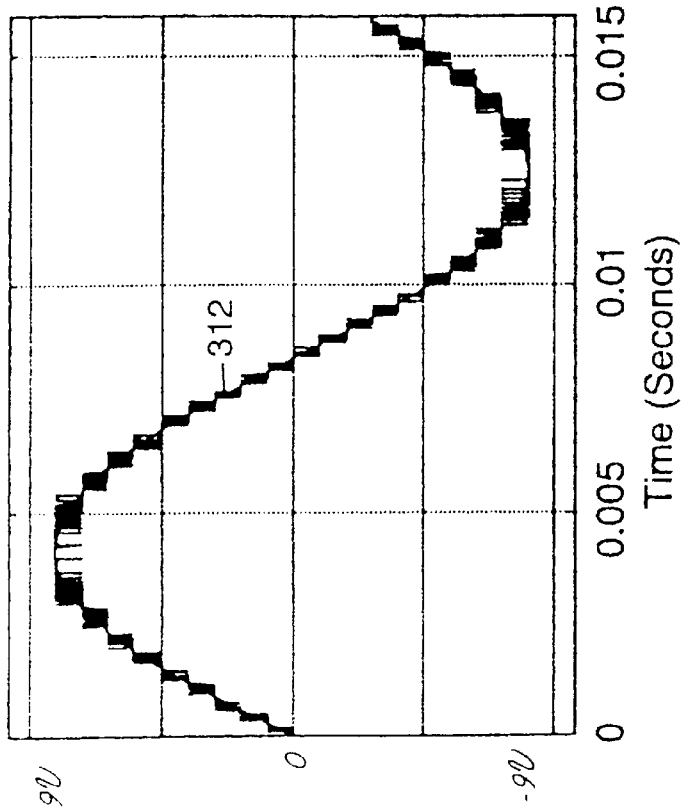
FIG. 17 is a waveform diagram illustrating an exemplary output voltage waveform for a multilevel inverter in accordance with the present invention having three DC source voltage levels of V, 2V, and 6V, wherein the source voltage level V is pulse width modulated.
Figure 18:
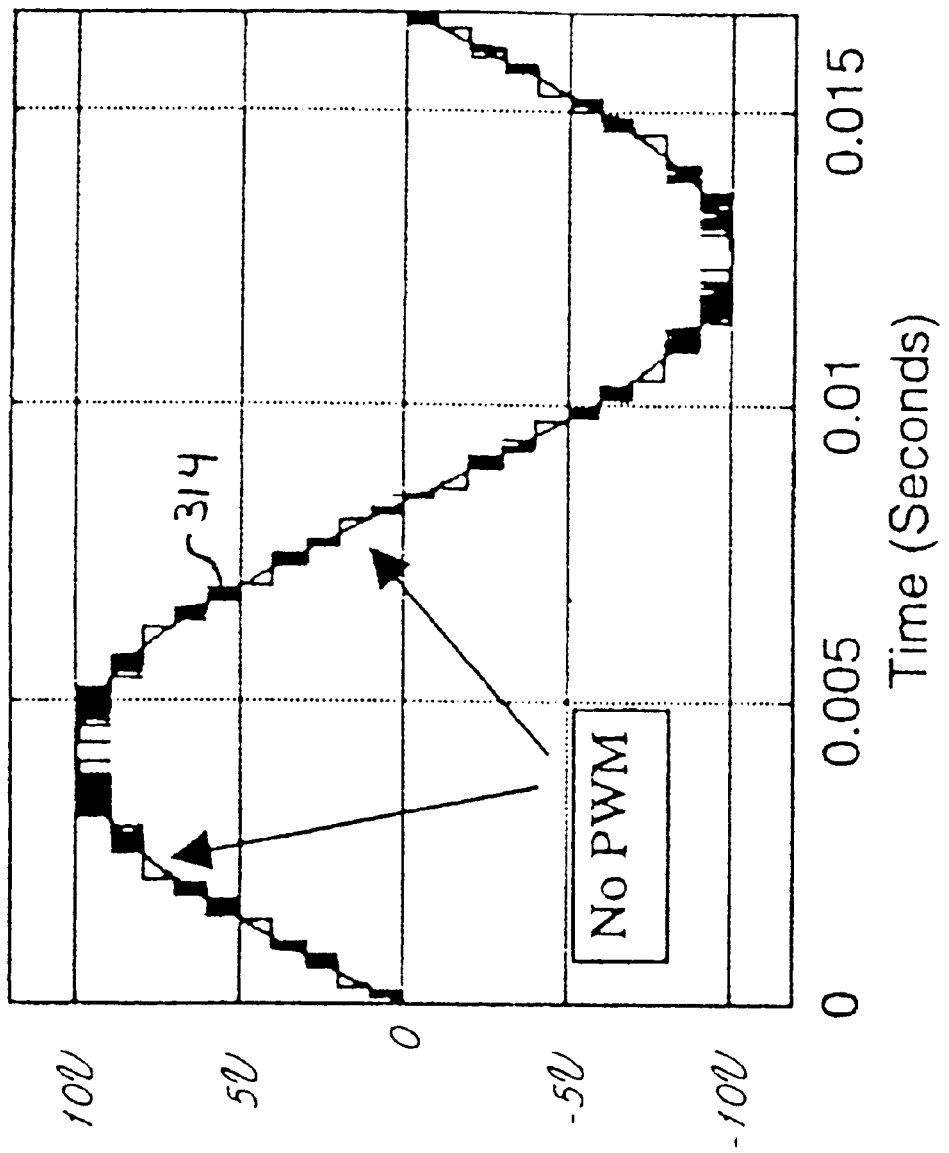
FIG. 18 is a waveform diagram illustrating an exemplary output voltage waveform for a multilevel inverter in accordance with the present invention having three DC source voltage levels of V, 3V, and 6V, wherein the source voltage level V is pulse width modulated.

An exemplary output voltage waveform for a multilevel inverter in accordance with the present invention having three inverter levels, with inverter DC source voltage levels of V, 2V, and 6V, and controlled using the exemplary controller 340 just described, is illustrated by the waveform 312 in FIG. 17.

It should be understood that the present invention is not limited to the particular exemplary embodiments, components, and applications described herein, but embraces all such modified forms thereof as come within the scope of the following claims. In particular, it should be noted that the present invention is not limited to the H-bridge inverter topologies described, or the use of IGBT and GTO thyristor inverter switching devices. Other types of high frequency, low frequency, high voltage blocking, and low voltage blocking inverter switching devices in various configurations may be employed.

What is claimed is:

1. A multilevel electric power converter, comprising:
   (a) a plurality of DC voltage sources providing DC source voltage levels, wherein a DC source voltage level provided by a one of the plurality of DC voltage sources is different from a DC source voltage level provided by another of the plurality of DC voltage sources;
   (b) inverter switching devices connected to the DC voltage sources to form a plurality of inverters connected in series to an output of the power converter; and
   (c) controller means for controlling the inverter switching devices to synthesize a multilevel inverter output voltage signal at the output of the power converter by selectively combining the DC source voltage levels provided by the DC voltage sources.

2. The multilevel electric power converter of claim 1 wherein the DC source voltage level provided by the one of the plurality of DC voltage sources is a multiple of the DC source voltage level provided by the other of the plurality of DC voltage sources.

3. The multilevel electric power converter of claim 2 wherein the DC source voltage level provided by the one of the plurality of DC voltage sources is approximately twice the DC source voltage level provided by the other of the plurality of DC voltage sources.

4. The multilevel electric power converter of claim 3 wherein the DC source voltage levels provided by the plurality of DC voltage sources vary in a binary fashion.

5. The multilevel electric power converter of claim 2 wherein the DC source voltage level provided by the one of the plurality of DC voltage sources is approximately three times the DC source voltage level provided by the other of the plurality of DC voltage sources.

6. The multilevel electric power converter of claim 5 wherein the DC source voltage levels provided by the plurality DC voltage sources vary in a geometric progression with a factor of three.

7. The multilevel electric power converter of claim 1 wherein the plurality of DC voltage sources includes more than two DC voltage sources providing more than two different DC source voltage levels.

8. The multilevel electric power converter of claim 1 wherein the inverter switching devices are connected to form an H-bridge inverter across each of the plurality of DC voltage sources, wherein the H-bridge inverters connected across each of the plurality of DC voltage sources are connected together in series across the output of the power converter.

9. The multilevel electric power converter of claim 8 wherein the controller means includes means for controlling the inverter switching devices in at least one of the H-bridge inverters to generate a pulse width modulated inverter output signal and means for controlling the inverter switching devices in another of the H-bridge inverters to generate a stepped waveform inverter output signal which is combined with the pulse width modulated inverter output signal to form the multilevel inverter output voltage signal.

10. The multilevel electric power converter of claim 9 wherein the controller means includes means for controlling the inverter switching devices in an H-bridge inverter connected across a DC voltage source of the plurality of DC voltage sources providing a lowest DC source voltage level to generate a pulse width modulated inverter output signal from the H-bridge inverter connected across a DC voltage source of the plurality of DC voltage sources providing a lowest DC source voltage level.

11. The multilevel electric power converter of claim 10 wherein the DC source voltage level of the DC voltage source of the plurality of DC voltage sources providing the lowest DC source voltage is V, and wherein the DC source voltage levels provided by the others of the plurality of DC voltage sources are $2*3^{n-2}V$ for n=2 to the number of DC voltage sources in the multilevel electric power converter.

12. A multilevel electric power converter, comprising:
   (a) a first inverter including a first DC voltage source providing a first DC source voltage level and first inverter switching devices connected across the first DC voltage source and responsive to first inverter switching device control signals;
   (b) a second inverter connected in series with the first inverter and including a second DC voltage source providing a second DC source voltage level and second inverter switching devices connected across the second DC voltage source and responsive to second inverter switching device control signals;
   (c) an output of the electric power converter connected to the first and second inverters; and
   (d) controller means for providing the first inverter switching device control signals and second inverter switching device control signals to control the first and second inverters to synthesize an AC voltage waveform on the output of the electric power converter, wherein the first inverter switching device control signals are provided at a frequency much higher than a fundamental frequency of the AC voltage waveform on the output of the electric power converter, and wherein the second inverter switching device control signals are provided to control the second inverter to produce a stepped waveform output signal.

13. The multilevel electric power converter of claim 12 wherein the first and second inverters are H-bridge inverters wherein the inverter switching devices are connected across the DC voltage sources in an H-bridge configuration.

14. The multilevel electric power converter of claim 12 wherein the first inverter switching devices are transistor based switching devices and the second inverter switching devices are high voltage blocking thyristor based switching devices.

15. The multilevel electric power converter of claim 12 wherein the first DC source voltage level is different from the second DC source voltage level.

16. The multilevel electric power converter of claim 15 wherein the second DC source voltage level is a multiple of the first DC source voltage level.

17. The multilevel electric power converter of claim 16 wherein the second DC source voltage level is twice the first DC source voltage level.

18. The multilevel electric power converter of claim 12 comprising at least one additional inverter including an additional DC voltage source providing an additional DC source voltage level and additional inverter switching devices connected across the additional DC voltage source and responsive to additional inverter switching device control signals, connected in series with the first and second inverters, and wherein the controller means includes additionally means for providing the additional inverter switching device control signals to control the additional inverter to produce a stepped waveform output signal in combination with the output of the second inverter.

19. The multilevel electric power converter of claim 18 wherein the second and additional DC source voltage levels are multiples of the first DC source voltage level.

20. The multilevel electric power converter of claim 19 wherein the first DC source voltage level is V, and wherein the DC source voltage levels provided by the second and additional DC voltage sources are $2*3^{n-2}$V for n=2 to the number of DC voltage sources in the multilevel electric power converter.

21. The multilevel electric power converter of claim 12 wherein the first inverter switching device control signals are pulse width modulated signals.

22. A method for providing a multilevel electric power converter output voltage signal, comprising the steps of:
 (a) providing a plurality of DC voltage sources having DC source voltage levels, wherein a DC source voltage level provided by a one of the plurality of DC voltage sources is different from a DC source voltage level provided by another of the plurality of DC voltage sources; and
 (b) synthesizing a multilevel electric power converter output voltage signal having a peak voltage level higher than a largest of the plurality of DC source voltage levels by selectively combining the DC source voltage levels provided by the DC voltage sources.

23. The method of claim 22 wherein the DC source voltage level provided by the one of the plurality of DC voltage sources is a multiple of the DC source voltage level provided by the other of the plurality of DC voltage sources.

24. The method of claim 23 wherein the DC source voltage level provided by the one of the plurality of DC voltage sources is approximately twice the DC source voltage level provided by the other of the plurality of DC voltage sources.

25. The method of claim 24 wherein DC source voltage levels provided by the plurality of DC voltage sources vary in a binary fashion.

26. The method of claim 23 wherein the DC source voltage level provided by the one of the plurality of DC voltage sources is approximately three times the DC source voltage level provided by the other of the plurality of DC voltage sources.

27. The method of claim 26 wherein the DC source voltage levels provided by the plurality of DC voltage sources vary in a geometric progression with a factor of three.

28. The method of claim 22 wherein the plurality of DC voltage sources includes more than two DC voltage sources providing more than two different DC source voltage levels.

29. The method of claim 22 including the step of providing inverter switching devices connected to form an H-bridge inverter across each of the plurality of DC voltage sources, wherein the H-bridge inverters connected across each of the plurality of DC voltage sources are connected together in series, and wherein the step of synthesizing the multilevel electric power converter output voltage signal includes the steps of controlling the inverter switching devices in at least one of the H-bridge inverters to generate a pulse width modulated inverter output signal and controlling the inverter switching devices in another of the H-bridge inverters to generate a stepped waveform inverter output signal which is combined with the pulse width modulated waveform inverter output signal which is combined with the pulse width modulated inverter output signal to form the multilevel electric power converter output voltage signal.

30. A method for controlling a multilevel electric power converter to synthesize an AC voltage waveform on an output thereof, wherein the electric power converter includes a first inverter having a first DC voltage source providing a first DC source voltage level and first inverter switching devices connected across the first DC voltage source and responsive to first inverter switching device control signals, a second inverter connected in series with the first inverter and having a second DC voltage source providing a second DC source voltage level and second inverter switching devices connected across the second DC voltage source and responsive to second inverter switching device control signals, wherein the output of the electric power converter is connected to the first and second inverters, comprising the steps of:
 (a) providing the first inverter switching device control signals at a frequency much higher than a fundamental frequency of the AC voltage waveform on the output of the electric power converter to produce a high frequency inverter output signal; and
 (b) providing the second inverter switching device control signals to control the second inverter to produce a stepped waveform output signal which is combined with the high frequency inverter output signal to produce the AC voltage waveform on the output of the electric power converter.

31. The multilevel electric power converter of claim 30 wherein the step of providing the first inverter switching device control signals includes the step of providing pulse width modulated control signals.

* * * * *